(12) United States Patent
Einhaus et al.

(10) Patent No.: US 9,832,784 B2
(45) Date of Patent: Nov. 28, 2017

(54) MCS TABLE ADAPTATION FOR LOW POWER ABS

(71) Applicant: Panasonic Intellectual Property Corporation of America, Torrance, CA (US)

(72) Inventors: Michael Einhaus, Langen (DE); Christian Wengerter, Kleinheubach (DE); Alexander Golitschek Edler von Elbwart, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 53 days.

(21) Appl. No.: 14/384,363

(22) PCT Filed: Feb. 25, 2013

(86) PCT No.: PCT/EP2013/053700
§ 371 (c)(1),
(2) Date: Sep. 10, 2014

(87) PCT Pub. No.: WO2013/135475
PCT Pub. Date: Sep. 19, 2013

(65) Prior Publication Data
US 2015/0085767 A1  Mar. 26, 2015

(30) Foreign Application Priority Data
Mar. 16, 2012  (EP) ..................................... 12159964

(51) Int. Cl.
*H04W 72/04* (2009.01)
*H04B 1/10* (2006.01)
(Continued)

(52) U.S. Cl.
CPC ........... *H04W 72/12* (2013.01); *H04L 1/0001* (2013.01); *H04L 5/003* (2013.01)

(58) Field of Classification Search
CPC .... H04W 72/12; H04W 72/04; H04L 1/1893; H04L 1/0026; H04L 1/0001; H04L 5/003; H04L 1/0009; H04B 1/10; H04B 7/0632
(Continued)

(56) References Cited

U.S. PATENT DOCUMENTS 7,257,423 B2   8/2007  Iochi
7,555,269 B2 * 6/2009  Tamaki ................. H04L 1/0003
                                                       375/260
(Continued)

FOREIGN PATENT DOCUMENTS

| JP | 2004-173019 A | 6/2004 |
| JP | 2010-504686 A | 2/2010 |
| WO | 2008/056774 A1 | 5/2008 |

OTHER PUBLICATIONS

3GPP TS 36.104 V10.5.0, "3rd Generation Partnership Project; Technical Specification Group Radio Access Network; Evolved Universal Terrestrial Radio Access (E-UTRA); Base Station (BS) radio transmission and reception (Release 10)," Dec. 2011, 34 pages.

(Continued)

*Primary Examiner* — Edan Orgad
*Assistant Examiner* — Vanneilian Lalchinthang
(74) *Attorney, Agent, or Firm* — Seed IP Law Group LLP

(57) ABSTRACT

The present invention relates to methods and apparatuses for transmitting data in a multicarrier telecommunication system and in particular for performing modulation and coding for low transmission power data. Scheduling information indicating resources on which a terminal is scheduled to transmit data is received at the terminal. The scheduling
(Continued)

information includes a modulation and coding indicator set. Data are transmitted on the scheduled resources in accordance with a modulation and coding indicator in the modulation and coding indicator set and with a transmission parameter of the data to be transmitted.

14 Claims, 21 Drawing Sheets

(51) Int. Cl.
*H04W 72/00* (2009.01)
*H04W 72/12* (2009.01)
*H04L 1/00* (2006.01)
*H04L 5/00* (2006.01)

(58) Field of Classification Search
USPC .......................................................... 370/329
See application file for complete search history.

(56) References Cited

U.S. PATENT DOCUMENTS

| | | | | |
|---|---|---|---|---|
| 8,098,759 | B2* | 1/2012 | Futagi et al. | 375/295 |
| 8,170,600 | B2 | 5/2012 | Song et al. | |
| 8,675,794 | B1* | 3/2014 | Perets | H04B 1/10 375/225 |
| 8,861,662 | B1* | 10/2014 | Perets | H04L 1/0003 375/225 |
| 2005/0208973 | A1 | 9/2005 | Iochi | |
| 2007/0066242 | A1* | 3/2007 | Yi | H04L 1/0003 455/69 |
| 2009/0010211 | A1* | 1/2009 | Sumasu | H04L 1/0003 370/329 |
| 2009/0323641 | A1 | 12/2009 | Futagi et al. | |
| 2010/0113048 | A1* | 5/2010 | Sawahashi et al. | 455/450 |
| 2010/0215004 | A1* | 8/2010 | Yoo | H04L 1/0031 370/329 |
| 2010/0317382 | A1* | 12/2010 | Lee, II | H04B 7/0628 455/501 |
| 2011/0003605 | A1 | 1/2011 | Song et al. | |
| 2011/0235604 | A1* | 9/2011 | Inoue | H04L 1/0016 370/329 |
| 2011/0268065 | A1* | 11/2011 | Park et al. | 370/329 |

OTHER PUBLICATIONS

ETSI TS 136 211 V10.0.0, "LTE; Evolved Universal Terrestrial Radio Access (E-UTRA); Physical channels and modulation (3GPP TS 36.211 version 10.0.0 Release 10)," Jan. 2011, 12 pages.
ETSI TS 136 211 V10.4.0, "LTE; Evolved Universal Terrestrial Radio Access (E-UTRA); Physical channels and modulation (3GPP TS 36.211 version 10.4.0 Release 10)," Jan. 2012, 6 pages.
ETSI TS 136 212 V10.0.0, "LTE; Evolved Universal Terrestrial Radio Access (E-UTRA); Multiplexing and channel coding (3GPP TS 36.212 version 10.0.0 Release 10)," Jan. 2011, 50 pages.
Gharaibeh et al., "Accurate Estimation of Digital Communication System Metrics—SNR, EVM and p in a Nonlinear Amplifier Environment," 64th ARFTG Microwave Measurements Conference, 2004, 4 pages.
International Search Report dated Jun. 28, 2013, for corresponding International Application No. PCT/EP2013/053700, 6 pages.
Nokia Siemens Networks, Nokia, "Performance of low power ABS," R1-120714, Agenda Item: 7.3.1, 3GPP TSG RAN WG1 #68 Meeting, Dresden, Germany, Feb. 6-10, 2012, 7 pages.
Nokia Siemens Networks, Nokia, "Considerations on Reduced Transmission Power ABS Concept," R4-120402, Agenda Item: 6.20, 3GPP TSG RAN WG4 #62 Meeting, Dresden, Germany, Feb. 6-10, 2012, 8 pages.
Panasonic, "Potential Issues regarding Low Power ABS," R1-120223, Agenda Item: 7.3.4, 3GPP TSG-RAN WG1 Meeting 68, Dresden, Germany, Feb. 6-10, 2012, 4 pages.
Sesia et al., "LTE—The UMTS Long Term Evolution: From Theory to Practice," John Wiley & Sons, Ltd., ISBN: 978-0-470-69716-0, 2009, Section 9.3.2.3, 35 pages.
ETSI TS 136.213 V10.0.1, "LTE: Evolved Universal Terrestrial Radio Access (E-UTRA); Physical layer procedures (3GPP TS 36.213 version 10.0.1 Release 10)," Jan. 2011, 100 pages.
3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)," Mar. 2010, 104 pages.
Extended European Search Report dated Aug. 24, 2012, for corresponding EP Application No. 12159964.1-2415, 9 pages.
English Translation of Notice of Reasons for Rejected, dated May 24, 2016, for corresponding JP Application No. 2014-561351, 16 pages.

* cited by examiner

MCS Table 0

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

MCS Table 1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 15 |
| 18 | 4 | 16 |
| 19 | 4 | 17 |
| 20 | 4 | 18 |
| 21 | 4 | 19 |
| 22 | 4 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

CR = 0.33 (at TBS Index 9, row MCS 10)
CR = 0.63 (at TBS Index 15, rows MCS 16–17)
CR = 0.97 (at TBS Index 20, row MCS 22)

extended CRs for QPSK (MCS 10–22)

Not efficiently usable due to modulation order restriction (MCS 23–28)

Fig. 12

MCS Table 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 9 |
| 11 | 2 | 10 |
| 12 | 2 | 11 |
| 13 | 2 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

CR = 0.11 (at TBS Index 0)
CR = 0.65 (at TBS Index 9)
CR = 0.94 (at TBS Index 12)

extended CRs for QPSK

Not efficiently usable due to modulation order restriction

Fig. 13

MCS Table 3

| MCS Index $I_{MCS}$ | Modulation Order $Q_m$ | TBS Index $I_{TBS}$ | |
|---|---|---|---|
| 0 | 2 | 0 | |
| 1 | 2 | 1 | |
| 2 | 2 | 2 | |
| 3 | 2 | 3 | |
| 4 | 2 | 4 | |
| 5 | 2 | 5 | |
| 6 | 2 | 6 | |
| 7 | 2 | 7 | |
| 8 | 2 | 8 | |
| 9 | 2 | 9 | |
| 10 | 2 | 10 | extended CRs for QPSK |
| 11 | 2 | 11 | |
| 12 | 2 | 12 | |
| 13 | 4 | 9 | |
| 14 | 4 | 10 | |
| 15 | 4 | 11 | |
| 16 | 4 | 12 | |
| 17 | 4 | 13 | |
| 18 | 4 | 14 | |
| 19 | 4 | 15 | |
| 20 | 4 | 16 | extended CRs for 16 QAM |
| 21 | 4 | 17 | |
| 22 | 4 | 18 | |
| 23 | 4 | 19 | |
| 24 | 4 | 20 | |
| 25 | 6 | 15 | |
| 26 | 6 | 16 | |
| 27 | 6 | 17 | |
| 28 | 6 | 18 | |
| 29 | 2 | reserved | |
| 30 | 4 | | |
| 31 | 6 | | |

MCS TABLE ADAPTATION FOR LOW POWER ABS

FIELD OF THE INVENTION

The invention relates to methods for transmitting and receiving data in a multicarrier communication system. The invention is also providing the mobile terminal and the base station apparatus for performing the methods described herein.

TECHNICAL BACKGROUND

Long Term Evolution (LTE)

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The downlink will support data modulation schemes QPSK, 16QAM, and 64QAM and the uplink will support QPSK, 16QAM, and at least for some devices also 64QAM, for physical data channel transmissions. The term "downlink" denotes direction from the network to the terminal. The term "uplink" denotes direction from the terminal to the network.

LTE's network access is to be extremely flexible, using a number of defined channel bandwidths between 1.4 and 20 MHz, compared with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

LTE Architecture

The overall architecture of an LTE network is shown in FIG. 1 and a more detailed representation of the E-UTRAN architecture is given in FIG. 2.

As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). In a 3GPP mobile network, the mobile terminal 110 (called User Equipment, UE, or device) is attached to the access network via the Node B (NB) in the UTRAN and via the evolved Node B (eNB) in the E-UTRAN access. The NB and eNB 120 entities are known as base station in other mobile networks. There are two data packet gateways located in the EPS for supporting the UE mobility—Serving Gateway (SGW) 130 and Packet Data Network Gateway 160 (PDN-GW or shortly PGW). Assuming the E-UTRAN access, the eNB entity 120 may be connected through wired lines to one or more SGWs via the S1-U interface ("U" stays for "user plane") and to the Mobility Management Entity 140 (MME) via the S1-MMME interface. The SGSN 150 and MME 140 are also referred to as serving core network (CN) nodes.

As anticipated above and as depicted in FIG. 2, the E-UTRAN consists of eNodeB 120, providing the E-UTRA user plane (PDCP/RLC/MAC/PHY) and control plane (RRC) protocol terminations towards the user equipment (UE). The eNodeB 120 hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs 120 are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs 120. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME 140 is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

FIGS. 3 and 4 illustrate the structure of a component carrier in the LTE release 8. The downlink component carrier of a 3GPP LTE Release 8 is subdivided in the time-frequency domain in so-called subframes, each of which is divided into two downlink slots as shown in FIG. 3. A downlink slot corresponding to a time period $T_{slot}$ is shown in detail in FIGS. 3 and 4 with the reference numeral 320. The first downlink slot of a subframe comprises a control channel region (PDCCH region) within the first OFDM symbol(s). Each subframe consists of a give number of OFDM symbols in the time domain (12 or 14 OFDM symbols in 3GPP LTE (Release 8)), wherein each OFDM symbol spans over the entire bandwidth of the component carrier.

In particular, the smallest unit of resources that can be assigned by a scheduler is a resource block also called physical resource block (PRB). With reference to FIG. 4, a PRB 330 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the subframe in the time domain. $N_{symb}^{DL}$ may be either 6 or 7 resulting in either 12 or 14 OFDM symbols in total. Consequently, a physical resource block 330 consists of $N_{symb}^{DL} \times N_{sc}^{RB}$ resource elements corresponding to one slot in the time domain and 180 kHz in the frequency domain (further details on the downlink resource grid can be found, for example, in 3GPP TS 36.211, "Evolved universal terrestrial radio access (E-UTRA); physical channels and modulations (Release 10)", version 10.4.0, 2012, Section 6.2, freely available at www.3gpp.org, which is incorporated herein by reference). While it can happen that some resource elements within a resource block or resource block pair are not used even though it has been scheduled, for simplicity of the used terminology still the whole resource block or resource block pair is assigned. Examples for resource elements that are actually not assigned by a scheduler include reference signals, broadcast signals, synchronization signals, and resource elements used for various control signal or channel transmissions.

The number of physical resource blocks $N_{RB}^{DL}$ in downlink depends on the downlink transmission bandwidth configured in the cell and is at present defined in LTE as being from the interval of 6 to 110 (P)RBs. It is common practice in LTE to denote the bandwidth either in units of Hz (e.g. 10 MHz) or in units of resource blocks, e.g. for the downlink case the cell bandwidth can equivalently expressed as e.g. 10 MHz or $N_{RB}^{DL}=50RB$.

A channel resource may be defined as a "resource block" as exemplary illustrated in FIG. 3 where a multi-carrier communication system, e.g. employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g. time slot, subframe, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink: Localised Virtual Resource Block (LVRB) and Distributed Virtual Resource Block (DVRB). In the localised transmission mode using the localised VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 the downlink control signalling is basically carried by the following three physical channels:

Physical control format indicator channel (PCFICH) for indicating the number of OFDM symbols used for control signalling in a subframe (i.e. the size of the control channel region); Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signalling region of a downlink subframe using a known pre-defined modulation and coding scheme. The user equipment decodes the PCFICH in order to obtain information about a size of the control signalling region in a subframe, for instance, the number of OFDM symbols. If the user equipment (UE) is unable to decode the PCFICH or if it obtains an erroneous PCFICH value, it will not be able to correctly decode the L1/L2 control signalling (PDCCH) comprised in the control signalling region, which may result in losing all resource assignments contained therein.

The PDCCH carries control information, such as, for instance, scheduling grants for allocating resources for downlink or uplink data transmission. The PDCCH for the user equipment is transmitted on the first of either one, two or three OFDM symbols according to PCFICH within a subframe.

Physical downlink shared channel (PDSCH) is used to transport user data. PDSCH is mapped to the remaining OFDM symbols within one subframe after PDCCH. The PDSCH resources allocated for one UE are in the units of resource block for each subframe.

Physical uplink shared channel (PUSCH) carries user data. Physical Uplink Control Channel (PUCCH) carries signalling in the uplink direction such as scheduling requests, HARQ positive and negative acknowledgements in response to data packets on PDSCH, and channel state information (CSI).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radio-communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Channel Quality Reporting

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

Accordingly, the resource grants are transmitted from the eNodeB to the UE in downlink control information (DCI) via PDCCH. The downlink control information may be transmitted in different formats, depending on the signaling information necessary. In general, the DCI may include:
  a resource block assignment (RBA),
  modulation and coding scheme (MCS).

The DCI may include further information, depending on the signaling information necessary, as also described in Section 9.3.2.3 of the book "*LTE: The UMTS Long Term Evolution from theory to practice*" by S. Sesia, I. Toufik, M. Baker, Apr. 2009, John Wiley & Sons, ISBN 978-0-470-69716-0, which is incorporated herein by reference. For instance, the DCI may further include HARQ related information such as redundancy version, HARQ process number, or new data indicator; MIMO related information such as pre-coding; power control related information, etc. Other channel quality elements may be the Precoding Matrix Indicator (PMI) and the Rank Indicator (RI). Details about the involved reporting and transmission mechanisms are given in the following specifications to which it is referred for further reading (all documents available at http://www.3gpp.org and incorporated herein by reference):

3GPP TS 36.211, "Evolved Universal Terrestrial Radio Access (E-UTRA); Physical channels and modulation", version 10.0.0, particularly sections 6.3.3, 6.3.4,
  3GPP TS 36.212, "Evolved Universal Terrestrial Radio Access (E-UTRA); Multiplexing and channel coding", version 10.0.0, particularly sections 5.2.2, 5.2.4, 5.3.3,
  3GPP TS 36.213, "Evolved Universal Terrestrial Radio Access (E-UTRA); Physical layer procedures", version 10.0.1, particularly sections 7.1.7, and 7.2.

In 3GPP LTE, not all of the above identified channel quality elements are reported at any time. The elements being actually reported depend mainly on the configured reporting mode. It should be noted that 3GPP LTE also supports the transmission of two codewords (i.e. two codewords of user data (transport blocks) may be multiplexed to and transmitted in a single subframe), so that feedback may be given either for one or two codewords. It should be noted that this information is based on 3GPP TS 36.213, section 7.2.1 mentioned above.

The resource block assignment specifies the physical resource blocks which are to be used for the transmission in uplink or downlink.

The modulation and coding scheme defines the modulation scheme employed for the transmission such as QPSK, 16-QAM or 64-QAM. The lower the order of the modulation, the more robust is the transmission. Thus, 64-QAM is typically used when the channel conditions are good. The modulation and coding scheme also defines a code rate for a given modulation. The code rate is chosen depending on the radio link conditions: a lower code rate can be used in poor channel conditions and a higher code rate can be used in the case of good channel conditions. "Good" and "bad" here is used in terms of the signal to noise and interference ratio. The finer adaptation of the code rate is achieved by puncturing or repetition of the generic rate depending on the error correcting coder type.

FIG. 5 shows an example of an MCS table (MCS Table 0) used in LTE release 10 to determine the modulation order ($Q_m$) used in the physical downlink shared channel. The levels between 0 and 9 in downlink usually represent employing of the robust QPSK modulation. In uplink, LTE release 10 foresees an MCS table which essentially has the same structure of the MCS table for the downlink channel. In downlink the QPSK modulation scheme is represented by the MCS levels between 0 and 9 (for more details refer to 3GPP TS 36.213, "Evolved Universal Terrestrial Radio Access (E-UTRA); Physical layer procedures", version 10.0.1, sections 7 and 8, respectively). The remaining levels specify configurations with higher-level modulation schemes. The levels in the MCS table corresponding to the higher indexes (17 to 28) represent the 64QAM modulation scheme, which is not efficiently usable due to modulation order restrictions. The QPSK and 16QAM modulation schemes are also indicated, in the actual scenario, as low-order modulation schemes as compared to the 64QAM modulation scheme. In general with the term low-order modulation scheme has to be understood any modulation order lower than the highest supported modulation order.

The CSI is reported for every component carrier, and, depending on the reporting mode and bandwidth, for different sets of subbands of the component carrier. A channel resource may be defined as a "resource block" as exemplary illustrated in FIG. 4 where a multi-carrier communication system, e.g. employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g. time slot, subframe, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

Assuming that the smallest assignable resource unit is a resource block, in the ideal case channel quality information for each and all resource blocks and each and all users should be always available. However, due to constrained capacity of the feedback channel this is most likely not feasible or even impossible. Therefore, reduction or compression techniques are required so as to reduce the channel quality feedback signalling overhead, e.g. by transmitting channel quality information only for a subset of resource blocks for a given user.

In 3GPP LTE, the smallest unit for which channel quality is reported is called a subband, which consists of multiple frequency-adjacent resource blocks.

As described before, user equipments will usually not perform and report CSI measurements on configured but deactivated downlink component carriers but only radio resource management related measurements like RSRP (Reference Signal Received Power) and RSRQ (Reference Signal Received Quality). When activating a downlink component carrier, it's important that the eNodeB acquires quickly CSI information for the newly activated component carrier(s) in order to being able to select an appropriate MCS for efficient downlink scheduling. Without CSI information the eNodeB doesn't have knowledge about the user equipment's downlink channel state and would most likely select a too aggressive or too conservative MCS for downlink data transmission, both of which would in turn lead to resource utilization inefficiency due to required retransmissions or unexploited channel capacity.

Heterogeneous Networks

In the coming years, operators will begin deploying a new network architecture termed Heterogeneous Networks (HetNet). A typical HetNet deployment as currently discussed within 3GPP consists of macro and pico cells. Pico cells are formed by low power eNBs that may be advantageously placed at traffic hotspots in order to offload traffic from macro cells. Macro and pico eNBs implement the scheduling independently from each other. The mix of high power macro cells and low power pico cells can provide additional capacity and improved coverage.

Generally a terminal, such as a user equipment, connects to the node with the strongest downlink signal. In FIG. 6A, the area surrounding the low power eNBs and delimited by a solid line edge is the area where the downlink signal of the low power eNB is the strongest. User equipments within this area will connect to the appropriate low power eNB.

In order to expand the uptake area of a low power eNB without increasing its transmission power an offset is added to the received downlink signal strength in the cell-selection mechanism. In this manner the low power eNB can cover a larger uptake area or in other words the Pico Cells are provided with cell rage expansion (CRE). CRE is a means to increase the throughput performance in such deployments. A UE connects to a macro eNB only if the received power is at least G dB larger than the received power from the strongest pico eNB, where G is the semi-statically configured CRE bias. Typical values are expected to range from 0 to 20 dB.

FIG. 6A illustrates such a HetNet scenario where various pico cells are provided in the area of one macro cell. The range expansion zone (CRE) is delimited in FIG. 6 by a dashed edge. The pico cell edge without CRE is delimited by a solid line edge. Various UEs are shown located in the various cells. FIG. 6B schematically illustrates the concept of a HetNet scenario including a macro eNB and a plurality of pico eNB serving respectively a plurality of UEs located in their coverage areas.

A heterogeneous deployment with a range expansion in the range of 3 to 4 dB has been already considered in the LTE release 8. Nevertheless, the applicability of CRE with cell selection offsets of up to 9 dB have currently being considered at RAN1.

However, the additional capacity provided by the smaller cells may be lost due to signal interference experienced by the UEs in the pico cells. The macro eNB is the single dominant interferer for pico UEs, i.e. for UEs being connected to the pico eNB. This is especially true for pico UEs at the cell edge when using CRE.

Furthermore, the interference problem is aggravated when multiple antenna transmissions are used, as will be explained in the following.

Multiple Antenna System

Multiple Input Multiple Output (MIMO) systems form an essential part of LTE in order to achieve the ambitious requirements for throughput and spectral efficiency. Multiple-input and multiple-output is the use of multiple antennas at both the transmitter and receiver to improve communication performance. It is one of several forms of smart antenna technology. Note that the terms input and output refer to the radio channel carrying the signal, not to the devices having antennas.

From a high-level perspective, MIMO can be sub-divided into three main categories, beamforming, spatial multiplexing and diversity coding.

MIMO transmissions are in general based on precoding which can be seen as multi-stream beamforming, in the narrowest definition. In more general terms, it is considered to be all spatial processing that occurs at the transmitter. Beamforming takes advantage of interference to change the directionality of the transmitted signal. When transmitting, a beamformer controls the phase and relative amplitude of the signal at each transmitter, in order to create a pattern of constructive and destructive interference in the wavefront.

In single-layer beamforming, the same signal is emitted from each of the transmit antennas with appropriate phase (and sometimes gain) weighting such that the signal power is maximized at the receiver input. The benefits of beamforming are to increase the received signal power level, by making signals emitted from different antennas add up constructively, and to reduce the multipath fading effect; this effect is known as beamforming gain. In the absence of scattering, beamforming results in a well defined directional pattern, but in typical cellular deployments conventional beams are not a good analogy. When there are multiple receivers (mobile terminals) in the system, superposition of multiple transmit beams can be performed if the receives have sufficient spatial separation. Precoding for beamforming requires knowledge of channel state information (CSI) at the transmitter in order to provide optimum adaptation to the channel. Note that single-layer beamforming does in general not require multiple receive antennas on the mobile terminal side.

Spatial multiplexing requires multiple transmit and receive antennas. In spatial multiplexing, a high rate signal is split into multiple lower rate streams and each stream is transmitted on a spatial layer which is mapped onto the set of transmit antennas in the same frequency channel. If these signals arrive at the receiver antenna array with sufficiently different spatial signatures, the receiver can separate these streams into (almost) parallel channels. Spatial multiplexing is a very powerful technique for increasing channel capacity at higher signal-to-noise ratios (SNR). The maximum number of spatial streams is limited by the lesser in the number of antennas at the transmitter or receiver. Spatial multiplexing can be used with or without transmit channel knowledge. Spatial multiplexing can also be used for simultaneous transmission to multiple receivers (mobile terminals), known as multi-user MIMO. By scheduling receivers with different spatial signatures, good separability can be assured.

When there is no channel knowledge at the transmitter, diversity coding techniques can be used. In diversity methods, a single data stream (unlike multiple streams in spatial multiplexing) is transmitted, but the signal is coded using techniques called space-time coding. The signal is emitted from each of the transmit antennas with full or near orthogonal coding. Diversity coding exploits the independent fading in the multiple antenna links to enhance signal diversity. Because there is no channel knowledge on the transmitter side, there is no beamforming gain from diversity coding.

Spatial multiplexing can also be combined with beamforming if the channel is known at the transmitter or combined with diversity coding if increased decoding reliability is required.

Intercell Interference and Coordination

Cell-edge users served by a pico eNodeB usually have relatively low received signal strength, especially if they are located at the border of a pico cell with CRE and suffer from strong intercell interference. The major interferer is the eNodeB serving the macro cell in the Heterogeneous Network, which usually transmits subframes at a high transmission power.

In multi-antenna transmissions with precoding on the interferer side, mobile terminals in the interfered cell may be strongly affected by the use of different precoding matrices in the interfering base station.

The basic interference impact factors are:

Very high average interference level

Very high SINR (CQI) estimation uncertainty due to strong interference flashlight effect The Interference Flashlight Effect refers to the effect that each precoding matrix that is used by the interfering base station (described by an Interferer Precoding Matrix Indicator—IPMI) yields a different interference power level on the interference victim mobile terminal side. Since the interferer uses different IPMIs at different times (depending on the multiuser scheduling), the interference victim mobile terminal experiences strong interference fluctuations depending on the IPMIs used by the interference source (interferer base station). These fluctuations are known as the flashlight effect and can result in severe uncertainty concerning the interference level estimation on the victim mobile terminal side.

In order to improve the throughput performance of cell-edge mobile terminals, the interference impact has to be reduced on the resource on which these mobile terminals are scheduled for downlink transmission. The objective of Inter-Cell Interference Coordination (ICIC) is to maximize the multi-cell throughput subject to power constraints, inter-cell signaling limitations, fairness objectives and minimum bit rate requirements.

One solution for interference mitigation is to use subframe patterns with different interference statistics. The concept of creating different interference patterns (e.g. different average interference power levels) of different subframe sets is supported by restricted interference measurements on configured subframe sets as specified in 3GPP RAN1:

Reporting processes for different subframe sets (e.g. Almost Blank Subframe (ABS), non-ABS)

Reports are based on average estimated interference level for a reference resource The channel quality is reported to the serving base station (eNB) in form of CQI (Channel Quality Indicator) reports which correspond to a quantization of the expected SINR level on the receiver side. However, CQI reports for different subframe sets and provide no information about expected variability of the interference power level (i.e. flashlight effect); only the average interference power level is taken into account.

Importantly, a strong variability of the interference power level (i.e. flashlight effect) can significantly increase the Block Error Rate (BLER) on the receiver side which results in reduced spectral efficiency.

In HetNet scenarios the coverage area of low power nodes (LPNs), such as pico eNodeBs, overlaps with the coverage area of macrocells and this poses the problem of effectively controlling intercell interference. Further, picocells with CRE allow a UE to access the cell with weak receiving power. Low power access together with downlink interference leads to a lower Signal to Interference plus Noise Ratio (SINR). In a network comprising a macrocell and a plurality of picocells, subscribers with access to picocells with CRE are vulnerable to macro-pico interference. In particular, subscribers that accessed a picocell and are located at the border of CRE, suffer from interference caused by the eNodeB of the macrocell transmitting to subscribers that accessed the macrocell.

A solution for reducing intercell interference is the implementation of the concept of almost blank subframes (ABS). This concept has been introduced in 3GPP release 10 as a means for ICIC. FIG. 7 shows the concept of ABS. The idea is that certain subframes are not used for PDSCH transmissions in the macro cells but only contain some necessary signaling signals, such as PSS/SSS, PBCH, CRS, Paging and SIB1 for assuring back compatibility with the previous LTE releases. That results in significantly reduced interference for picocells UEs scheduled in the same subframe, assumed that macro and picocell subframes are aligned in time. The ratio between number of ABS and number of regular subframes is known as ABS ratio. The optimum ABS ratio setting depends on network deployment, UE distribution and traffic load.

A drawback of using ABS for coordinating intercell interference is that these subframes can not be used for data transmission in the macro cell. As a further improvement of the concept of Almost Blank Subframes the use of Low Power ABS (LP-ABS) in the macrocell, to be supported in release 11, is currently discussed at RAN1.

Since the use of ABS in macrocells has the disadvantage that these subframes cannot be used for data transmissions in the macrocell, the concept of ABS has been extended by the concept of subframes with reduced PDSCH transmission power in 3GPP LTE, release 11. In particular, 3GPP RAN1 has agreed that the use of subframes with reduced PDSCH transmission power in macro cells can be used for inter-cell interference coordination (ICIC) in Heterogeneous Network scenarios consisting of macro and picocells with Cell Range Expansion (CRE). These subframes with reduced transmission power are also known as low power almost blank subframes (LP-ABS) and correspond to the ABS of 3GPP LTE, release 10. An example of LP-ABS in 3GPP LTE release 11 is shown in FIG. 8.

As discussed in the previous section, CRE bias values of up to 9 dB are currently considered at RAN1. Simulation studies of typical HetNet deployments revealed that the optimum PDSCH power reduction for LP-ABS in macrocells corresponds approximately to the CRE bias value. Consequently, in HetNet scenarios with picocells having CRE bias values of 9 dB, power reduction values for the LP-ABS of up to 9 dB can be considered. Reductions of 9 dB for the PDSCH transmission power of LP-ABS is an upper value given by the actual restrictions of 3GPP LTE and this value could change in the future.

In contrast to ABS in 3GPP LTE, release 10, PDSCH transmissions are now allowed in macrocells, but only with reduced transmission power and this is done by using LP-ABS.

The inter-cell interference coordination as defined in 3GPP LTE, release 11, is known as Further Enhanced ICIC (FeICIC) where it is currently discussed to introduce semi-static PDSCH power reduction on a given subframe set as a further optimization parameter in addition to the ABS ratio. Details of the downlink power allocation is specified in 3GPP TS 36.213, "Evolved Universal Terrestrial Radio Access (E-UTRA); Physical layer procedures", version 10.0.1, particularly section 5, which is hereby incorporated by reference.

FIG. 9 schematically illustrates a typical subframe structure in 3GPP LTE, release 10 (FIG. 9(a)) and supporting the PDSCH power reduction in release 11 (FIG. 9(b)). A subcarrier in the PDSCH region of the subframe includes common reference symbols (CRS), which are used for mobility measurements and determination of channel state information (CSI) on the UE side. A problem in implementing the above described concepts arises due to the fact that the transmission power of common reference symbols (CRS), cannot be reduced due to backward compatibility restrictions.

Consequently, the PDSCH power reduction results in a power level difference between CRS and resource elements (REs) of the PDSCH (dynamic range in frequency domain) in the LP-ABS. A large power level difference between CRS REs and PDSCH REs results in an increased EVM (Error Vector Magnitude) of the transmitted signal on transmitter (eNB) side where the exact EVM depends on the transmitter implementation. The Error Vector Magnitude is a measure of the difference between the ideal symbols and the measured symbols after equalization. In the context of digitally modulated signals the EVM is a measure of the deviation of the sent signal constellation from the ideal reference because of non-linearity. The non-linearity results in a compression and/or expansion and a rotation of the signal constellation. The EVM is specified in 3GPP TS 36.104, "Evolved Universal Terrestrial Radio Access (E-UTRA): Base Station (BS) Radio Transmission and Reception" version 10.5.0, section 6, which is hereby incorporated by reference.

An increased EVM on the transmitter side basically translates to a reduced SNR (Signal to Noise Ratio) experienced on the receiver side; an estimation of the relation is given by:

$$EVM_{RMS} \approx \left[\frac{1}{SNR}\right]^{1/2} = \left[\frac{N_0}{E_S}\right]^{1/2}$$

(for more details refer to K. M. Gharaibeh, K. G. Gard, M. B. Steer; "*Accurate Estimation of Digital Communication System Metrics—SNR, EVM and ρ in a Nonlinear Amplifier Environment*"; 64th ARFTG Microwave Measurements Conference, 2004).

The current minimum dynamic range requirements in the frequency domain that every eNB has to support for PDSCH transmissions without exceeding a certain given EVM is specified in the 3GPP TS 36.104, specifically in sections 6.3 to 6.5. In particular the dynamic range is defined as the difference between the transmitted energy per resource element of a PDSCH RE and of a CRS RE. Accordingly, the PDSCH transmissions that can be supported without exceeding a predefined EVM are listed in table 1 below:

TABLE 1

| Modulation scheme used on the RE | RE power control dynamic range (dB) | |
| --- | --- | --- |
| | (down) | (up) |
| QPSK (PDCCH) | −6 | +4 |
| QPSK (PDSCH) | −6 | +3 |
| 16QAM (PDSCH) | −3 | +3 |
| 64QAM (PDSCH) | 0 | 0 |

The specified EVM requirements for the different modulation schemes currently supported in 3GPP LTE are specified in table 2 below:

TABLE 2

| Modulation scheme for PDSCH | Required EVM [%] |
| --- | --- |
| QPSK | 17.5% |
| 16QAM | 12.5% |
| 64QAM | 8% |

Hence, the maximum PDSCH power level reductions for the different modulation schemes that can be assumed to be supported by all eNB implementations without exceeding the specified EVM requirement are given by table 3 below:

TABLE 3

| Modulation scheme for PDSCH | Maximum power reduction [dB] |
| --- | --- |
| QPSK | 6 |
| 16QAM | 3 |
| 64QAM | 0 |

The result of these restrictions is that high-order modulation schemes (16QAM and 64QAM) cannot be supported efficiently in subframes with low PDSCH transmission power if eNB implementations meet just the specified minimum requirements.

FIG. 10 shows a quantitative analysis of the macro UE throughput in a standard configuration including four picocells per macrocell and 9 dB CRE bias for picocell. This is a typical HetNet scenario as specified in 3GPP LTE TR 36.814: "Evolved Universal Terrestrial Radio Access (E-UTRA); Further advancements for E-UTRA physical layer aspects", release 9, which is herein incorporated by reference. Due to restriction requirements for PDSCH transmission in marocells on low power ABS (LP-ABS) the maximum power reductions applicable to the different modulation schemes are those listed in table 3 above. For an ABS ratio of 0.5 the UE experiences a drop in the throughput up to 17% compared to the case without the restrictions due to the utilization of LP-ABS (FIG. 10(a)). The gap further increases if an ABS ratio of 0.7 is considered. In particular, the UE throughput considering a restriction on the modulation schemes experiences a drop up to 25% compared to the UE throughput in the case that no restriction is applied to the usable modulation schemes. These results are shown in FIG. 10(b).

To conclude, the use of low power ABS (LP-ABS) combined with the restrictions specified in the 3GPP LTE, results in a reduction of the throughput at the User Equipment.

To conclude, the use of low power ABS combined with the restrictions specified in the 3GPP LTE, results in an increased EVM at the transmitter side in case of CRS based PDSCH transmissions and in a consequent reduction of the throughput and an increase of the SNR at the User Equipment.

A solution for reducing the EVM is to implement an enhanced macro eNB. In particular, the EVM could be reduced by increasing the dynamic range of the power amplifier in the eNB. The drawback of this solution is that it results in increased implementation cost.

Alternatively, the occurrence of an increased EVM in subframes with reduced PDSCH transmission power can be accepted as a further signal quality degradation in addition to receiver noise, interference and radio channel attenuation and fading. The eNB could schedule PDSCH transmissions with high-order modulation schemes ignoring the high EVM. The effect of that approach is an increased BLER due to the increased EVM.

Still another solution may be the avoiding the use of high-order modulation schemes in subframes with low PDSCH transmission power. Even if an UE reports a high CQI, the eNB would transmit PDSCHs only with low-order modulation schemes. This approach results in a system throughput reduction.

SUMMARY OF THE INVENTION

The present invention aims at avoiding the various disadvantages mentioned above.

In particular, the problem underlying the present invention is based on the observation that multicarrier telecommunication systems, for example systems transmitting data on low-power PDSCHs, are affected from a high EVM resulting in an increased BLER. This further results in a reduction of the throughput at the UE side. A further problem underlying the present invention is based on the observation that known solutions for controlling interference in multicarrier systems foresee either costly solutions, such as implementing costly hardware at the base station and at the terminal, or solutions that accept a drastic reduction of the transmission quality.

The aim of the present invention is to provide an efficient transmission mechanism providing an improvement in the transmission quality. In particular the present invention aims at reducing the SNR and at increasing the throughput at the UE side.

In accordance with a first aspect of the present invention, an apparatus is provided for transmitting data in a communication system. The apparatus comprises a control information reception unit configured to receive scheduling information indicating resources on which a terminal is scheduled to transmit data, the scheduling information including a modulation and coding indicator set; and a data transmission unit configured to transmit the data on the scheduled resources in accordance with a modulation and coding indicator in the modulation and coding indicator set and with a transmission parameter of the data to be transmitted.

In accordance with another aspect of the present invention, an apparatus is provided for receiving data in a communication system. The apparatus comprises a control information reception unit configured to receive scheduling information indicating resources on which a terminal is scheduled to receive data, the scheduling information including a modulation and coding indicator set; and a data reception unit configured to receive data on the scheduled resources in accordance with a modulation and coding indicator in the modulation and coding indicator set and with a transmission parameter of the data to be received.

In accordance with a further aspect of the present invention, a scheduling node is provided for transmitting data in a communication system. The apparatus comprises a control information reception unit configured to receive scheduling information indicating resources on which a terminal is scheduled to transmit data, the scheduling information including a modulation and coding indicator set; and a data transmission unit configured to transmit the data on the scheduled resources in accordance with a modulation and coding indicator in the modulation and coding indicator set and with a transmission parameter of the data to be transmitted.

In accordance with another aspect of the present invention, a scheduling node is provided for receiving data in a communication system. The apparatus comprises a control information reception unit configured to receive scheduling information indicating resources on which a terminal is scheduled to receive data, the scheduling information including a modulation and coding indicator set; and a data reception unit configured to receive data on the scheduled resources in accordance with a modulation and coding indicator in the modulation and coding indicator set and with a transmission parameter of the data to be received.

In accordance to an aspect of the present invention, the modulation and coding indicator in the modulation and coding indicator set may be selected based on a transmission parameter of the data to be transmitted or received.

The modulation and coding indicator may comprise a modulation order information and a data dimension information, the data dimension information being associated to the modulation order information according to the transmission parameter.

Additionally, the modulation and coding indicator may comprise a plurality of modulation and coding pairs including a modulation order information and a data dimension information;

wherein for at least one modulation and coding pair, the data dimension information is associated to the modulation order information according to the transmission parameter.

The modulation and coding indicator may consist of a plurality of bits and may be defined to be capable of taking:
a plurality of values as the data dimension information indicating the amount of the coded data to be employed for the scheduled transmission or reception; and
a plurality of values as the modulation order information indicating a modulation scheme of the coded data to be employed for the scheduled transmission or reception.

The apparatus or the scheduling node may further comprise a data comparing unit configured to compare the transmission parameter with a threshold value, and to select the modulation and coding indicator based on the comparison result, wherein the data are transmitted or received according to the indicated modulation and coding indicator.

The control information reception unit is further adapted to receive linking information, said linking information indicating a modulation indicator to be used for the scheduled transmission or reception.

The linking information may link data to be transmitted or received to a corresponding modulation and coding indicator. Further, the linking information may be transmitted to a terminal by a scheduling node. The inking information may be indicated to the terminal by the scheduling node via higher-layer signaling.

The modulation order information may be associated to a set of data dimension information, said set being larger than a set associated to the same modulation order information in a reference modulation and coding indicator.

The modulation order information may indicate a modulation scheme having an order lower than a maximum order.

The transmission parameter of the data to be transmitted includes a transmission power value of the data or a linking indicator.

Additionally, the transmission power may be the transmission power of the scheduling node.

According to a further aspect of the present invention, a method for transmitting data in a communication system is provided. The method comprises receiving scheduling information indicating resources on which a terminal is scheduled to transmit data, the scheduling information including a modulation and coding indicator set; and transmitting data on the scheduled resources in accordance with a modulation and coding indicator in the modulation and coding indicator set and a transmission parameter of the data to be transmitted or received.

According to a further aspect of the present invention, a method for receiving data in a communication system is provided. The method comprises receiving scheduling information indicating resources on which a terminal is scheduled to transmit data, the scheduling information including a modulation and coding indicator set; and receiving data on the scheduled resources in accordance with a modulation and coding indicator in the modulation and coding indicator set and a transmission parameter of the data to be transmitted or received.

The modulation and coding indicator may comprise a modulation order information and a data dimension information, the data dimension information being associated to the modulation order information according to the transmission parameter of the data set to be transmitted.

According to a further aspect of the present invention, the method may further comprise comparing the transmission parameter of the data to be transmitted with a threshold value, and selecting the modulation and coding indicator based on the comparison result, wherein the data are transmitted or received according to the selected modulation and coding indicator.

According to a further aspect of the present invention, the method may further comprise transmitting linking information, said linking information indicating a modulation and coding indicator, wherein the data are transmitted or received according to the indicated modulation and coding indicator.

According to an aspect of the present invention transmission of data may be performed in transmission time intervals.

According to a further aspect of the present invention the data may be transmitted with a low transmission power. In particular the data are transmitted in a Low Power Almost Blank Subframe.

According to a further aspect of the present invention, the data to be received or transmitted may in particular be transmitted on a Physical Downlink Shared Channel.

The above and other objects and features of the present invention will become more apparent from the following description and preferred embodiments given in conjunction with the accompanying drawings in which:

FIG. 5 is a table illustrating an example of a modulation and coding scheme table (MCS Table) in a downlink as defined for 3GPP LTE;

FIG. 12 is a table illustrating an example of modulation and coding scheme table (MCS Table) in downlink supporting an extended code rates for the 16QAM modulation scheme;

FIG. 13 is a table illustrating an example of an MCS Table in downlink supporting extended code rates for the QPSK modulation scheme;

FIG. 14 is a table illustrating an example of an MCS Table in downlink supporting extended code rates for the QPSK modulation scheme and extended code rates for the 16QAM modulation scheme;

DETAILED DESCRIPTION

Figure 1:
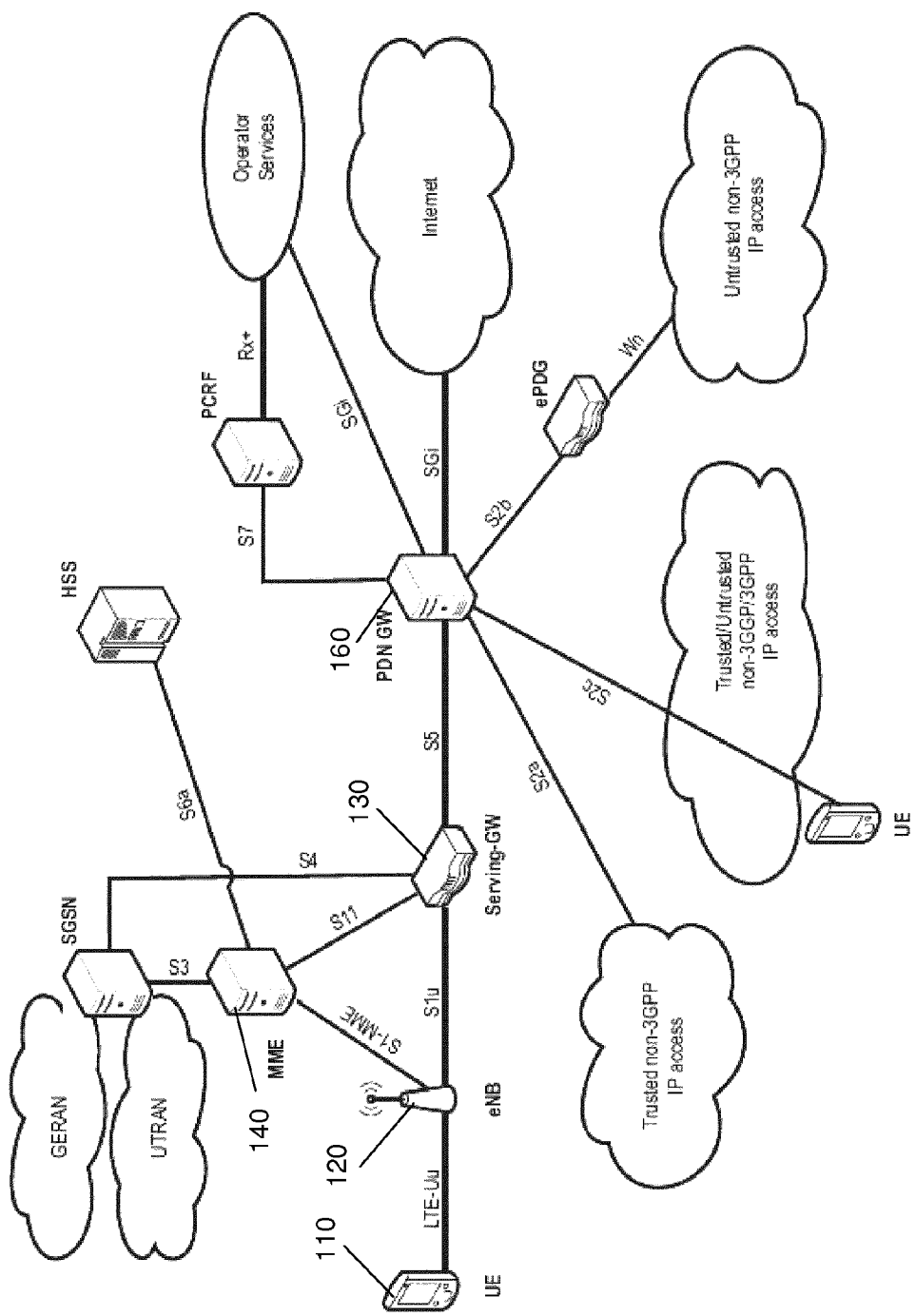
FIG. 1 is a schematic drawing showing the general structure of a subframe on a downlink component carrier defined for 3GPP LTE.
Figure 2:
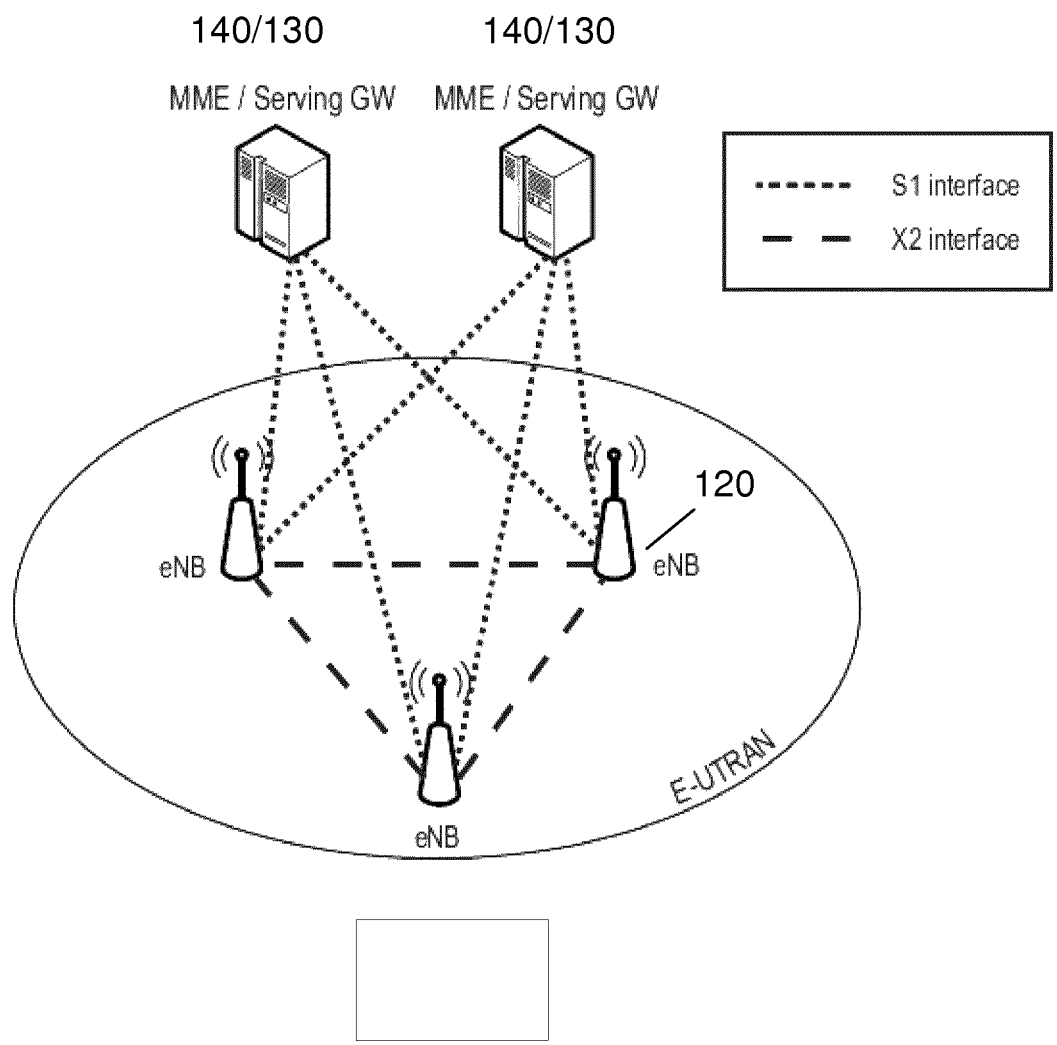
FIG. 2 shows an exemplary overview of the overall E-UTRAN architecture of 3GPP LTE.
Figure 3:
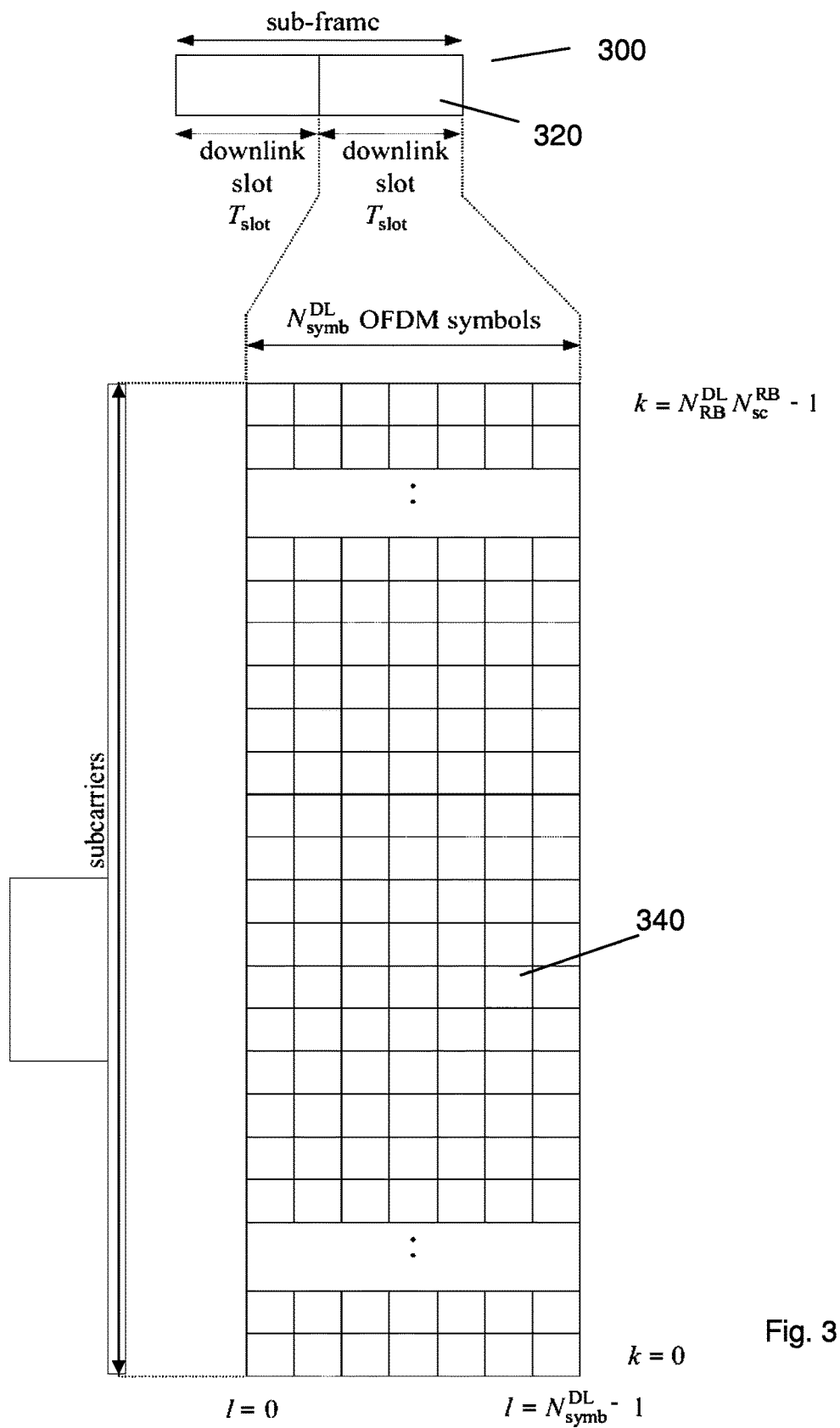
FIG. 3 shows an exemplary subframe boundary of a downlink component carrier as defined for 3GPP LTE.
Figure 4:
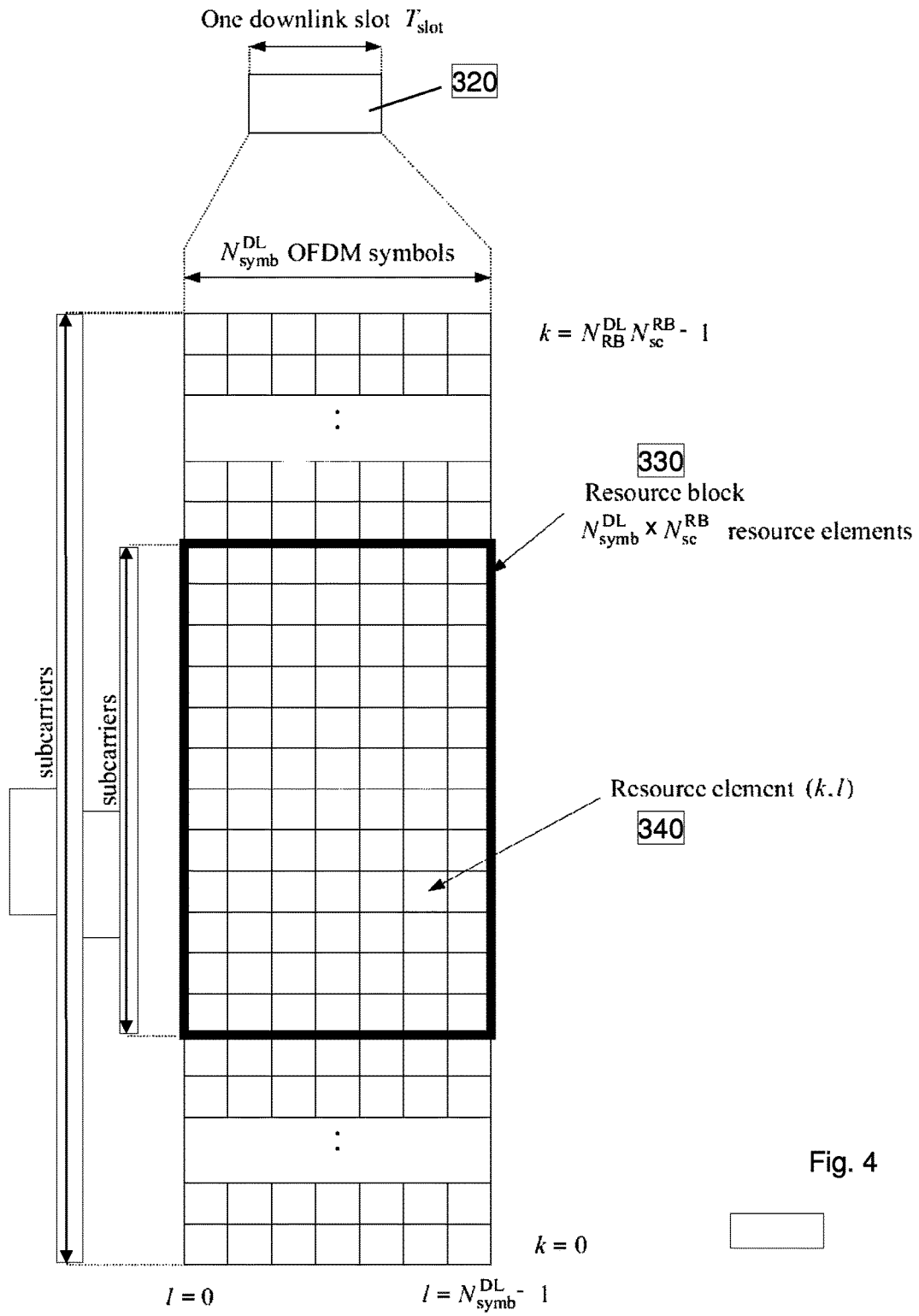
FIG. 4 is a schematic drawing illustrating an example of a resource grid in a downlink slot in 3GPP LTE.
Figure 6A:
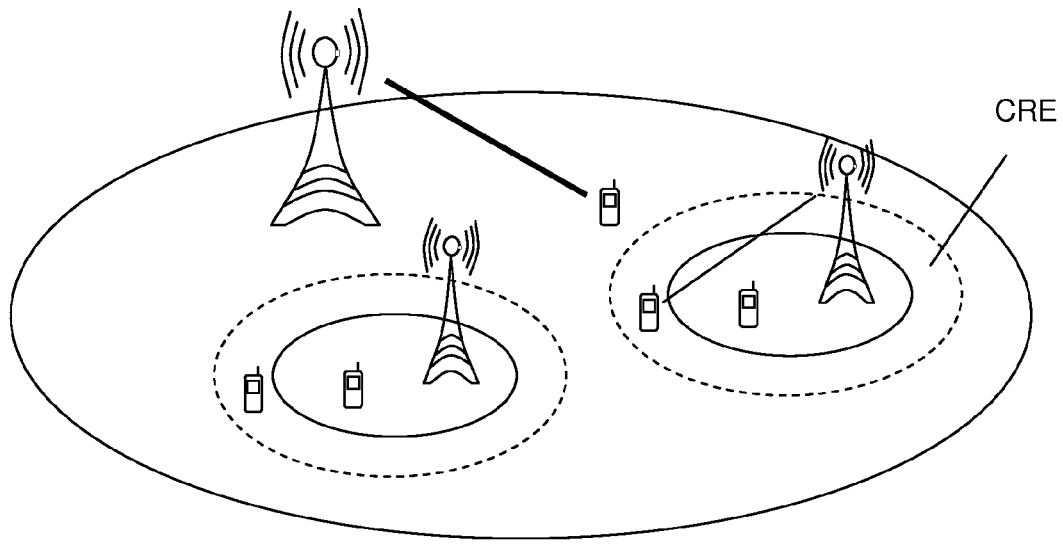
FIGS. 6A and 6B show a heterogeneous network (HetNet) with one macro cell and various picocells.
Figure 6B:
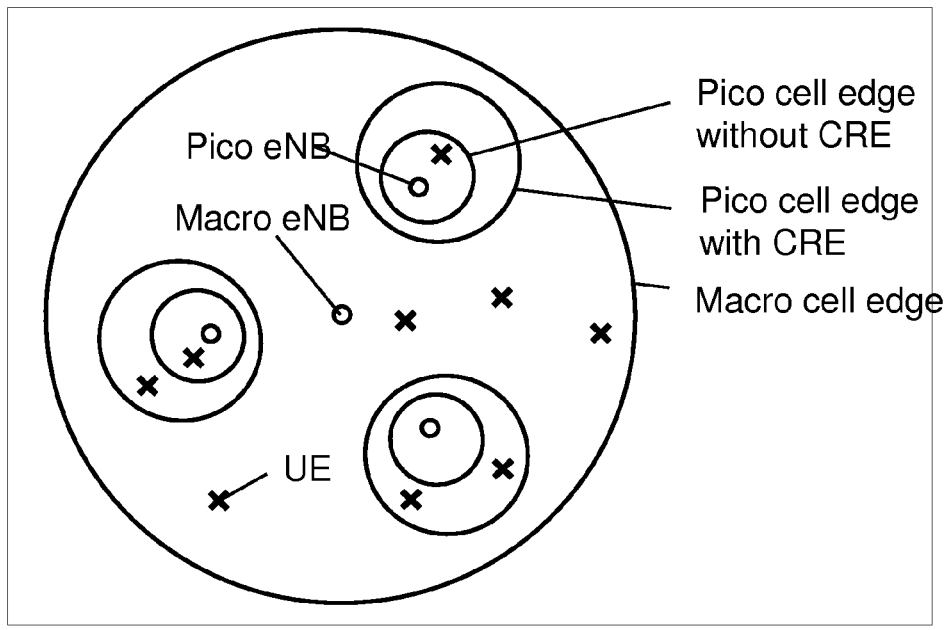
Figure 7:
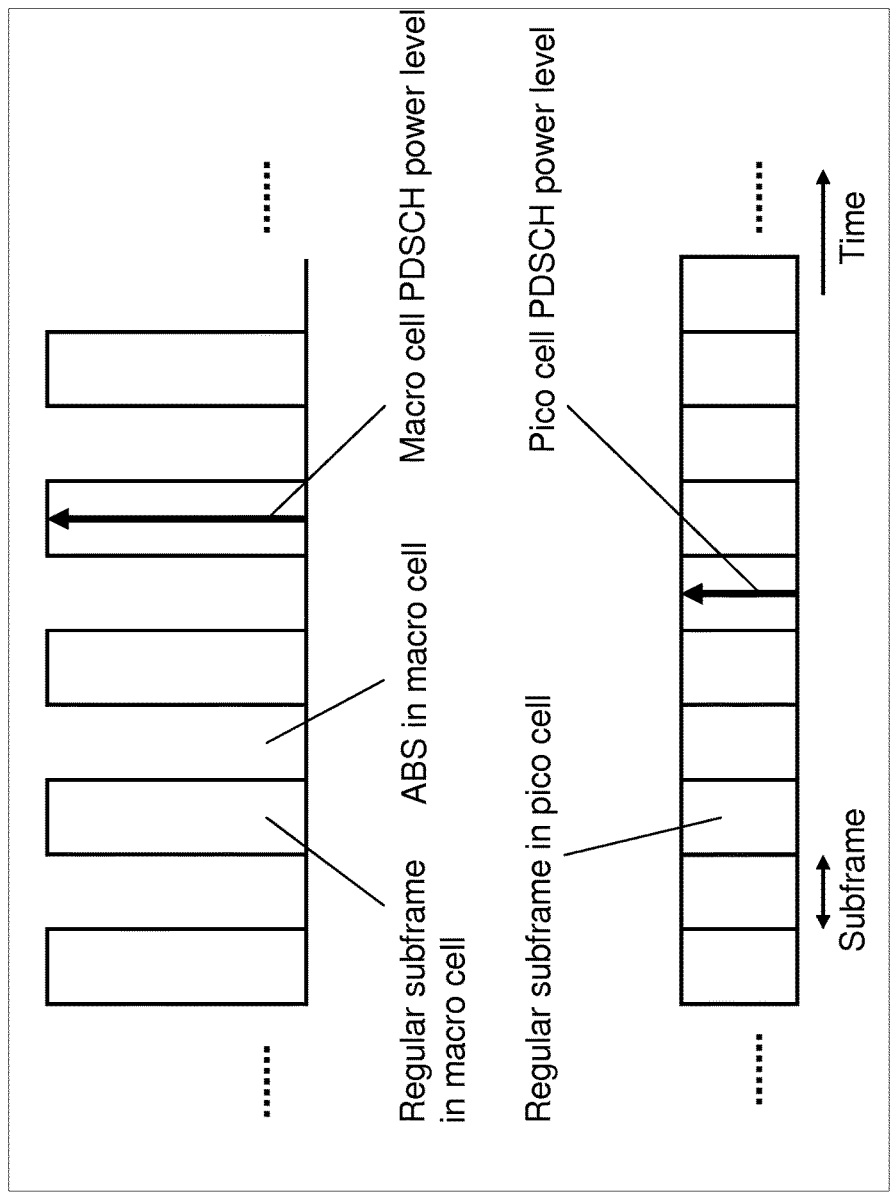
FIG. 7 is a schematic drawing illustrating the concept of an almost blank subframe (ABS) as defined for 3GPP LTE (release 10)
Figure 8:
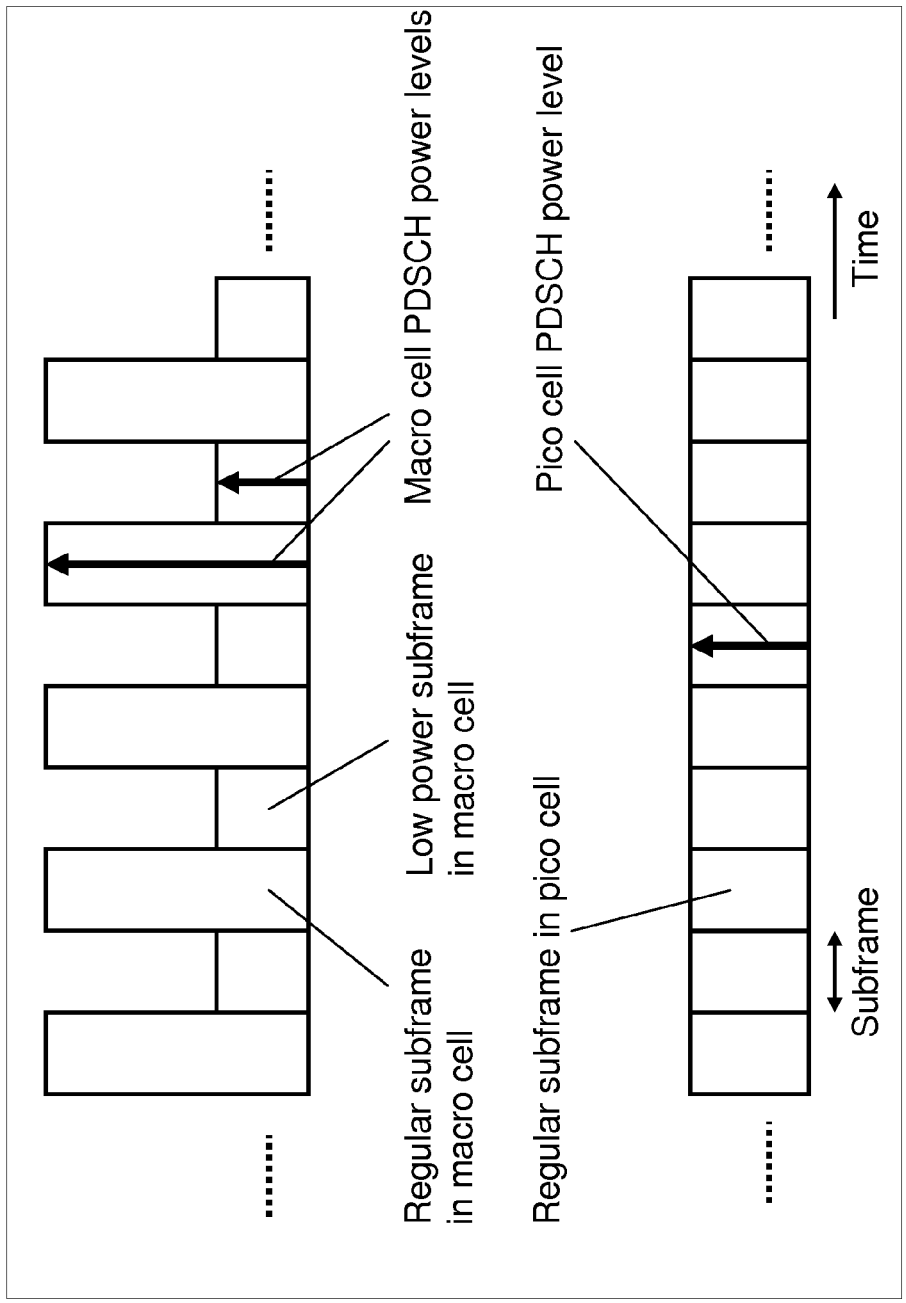
FIG. 8 is a schematic drawing illustrating the concept of a low power, almost blank subframe (LP-ABS) as discussed for 3GPP LTE (release 11)

The following paragraphs will describe various embodiments of the invention. For exemplary purposes only, the embodiments are outlined in relation to radio access schemes according to 3GPP LTE (release 8/9) and LTE-A (release 10/11) mobile communication systems, which were partly discussed in the technical background section above. It should be noted that the invention may be used, for example, in a mobile communication system such as 3GPP LTE-A (release 11) communication systems as described in the technical background section above, but the invention is not limited to its use in these particular exemplary communication networks. The invention may be, for example, used in non-3GPP systems such as WIMAX.

One aspect of the invention is to increase the user equipment (UE) throughput in a multi-carrier network system, such as a heterogeneous network, while reducing interference. As an example, the network system may be a heterogeneous network including a macro eNodeB in a macro cell and one or more picocells with cell range extension respectively served by a low power node, such as a pico eNodeB. The macro cell eNodeB communicates with a UE in the macro cell using low power ABS (LP-ABS) for reducing interference. In order to avoid a drop in the UE throughput in uplink/downlink, a set of modulation and coding scheme indicators, which may be for instance MCS tables, is implemented so as to take into account the reduction in the transmission power of data received or transmitted by the user equipment. Accordingly, data is received or transmitted based on a modulation and coding scheme table in the set and on a transmission parameter of the data to be transmitted. In particular, the transmission parameter may be the PDSCH power level of the eNodeB serving the macro cell. Alternatively, the transmission parameter may be linking information linking the data to be transmitted to a particular MSC table to be used for coding the data to be transmitted.

In the following the MCS Tables will be described as an example of modulation and code indicator. Similarly, a modulation order $Q_m$ is an example of modulation information and a transport block size or alternatively a TBS index in the MCS Tables will be described as an example of data dimension information.

In particular, an embodiment of the present invention provides for the support of an increased set of code rates for low-order modulation schemes in subframes with reduced PDSCH transmission power. Here and in the following, a low-order modulation scheme is intended to be a modulation scheme that gives a good error performance when used for modulating data on a given sub-carrier. For common network scenarios in use today, QPSK and 16QAM modulation schemes might be considered low-order modulation schemes. However, it has to be understood that with the increase of channel and sub-carrier quality, other modulation schemes, such as the 64QAM, may be considered low-order modulation schemes compared to further modulation schemes such as 256QAM. In particular, an alternative embodiment, a maximum modulation order scheme may be for instance the 256QAM modulation order. In this case the QPSK, 16QAM and 64QAM modulation schemes may be considered as low order modulation schemes. In other words, low-order has to be understood in this context as any modulation order that is lower than a maximum possible modulation order.

In the modulation and coding scheme index as defined for 3GPP LTE release 10, only a limited set of code rates for the QPSK and 16QAM (low-order modulation schemes) as well as 64QAM modulation scheme is supported. With reference to FIG. 5 already described in the background section above, the QPSK modulation scheme represented by the modulation order $Q_m=2$ is associated to ten TBS indexes (entries 0 to 9 of MCS Table 0 in FIG. 5). Similarly, entries 10 to 16 of Table 0 in FIG. 5 specify a modulation order $Q_m=4$, corresponding to a 16QAM modulation scheme, while entries 17 to 28 are dedicated to a 64QAM modulation scheme (modulation order $Q_m=6$). By means of the TBS indices in MCS Table 0, the modulation order may be associated to an allowed transport block size determination that can be used in combination with said modulation scheme (for more details refer to 3GPP TS 36.213, "Evolved Universal Terrestrial Radio Access (E-UTRA); physical layer procedures", version 10.0.1 sections 7). MCS Table 0 in FIG. 5 is generally a field of 5 bits including 32 entries and the TBS indices associated with a given modulation order is limited by such a constraint. The set of allowed transport block sizes for a given modulation order defines the set of code rates that can be obtained using a given modulation scheme.

The ranges of code rates supported by the 3GPP LTE release 10 are given in the table 4 below:

TABLE 4

| PDSCH modulation scheme | Code rate | |
|---|---|---|
| | Min | Max |
| QPSK | ~0.11 | ~0.65 |
| 16QAM | ~0.33 | ~0.63 |
| 64QAM | ~0.42 | ~1.00 |

Figure 9:
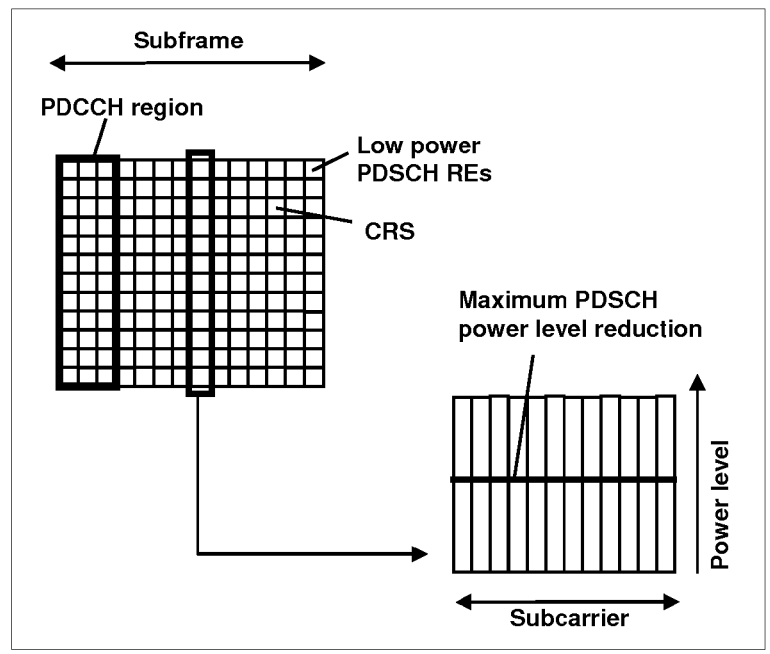
FIG. 9 is a schematic drawing illustrating power allocation for resource elements of a physical downlink shared channel and of cell-specific reference signals in a regular power subframe (a) and in a low power subframe (b)
Figure 9:
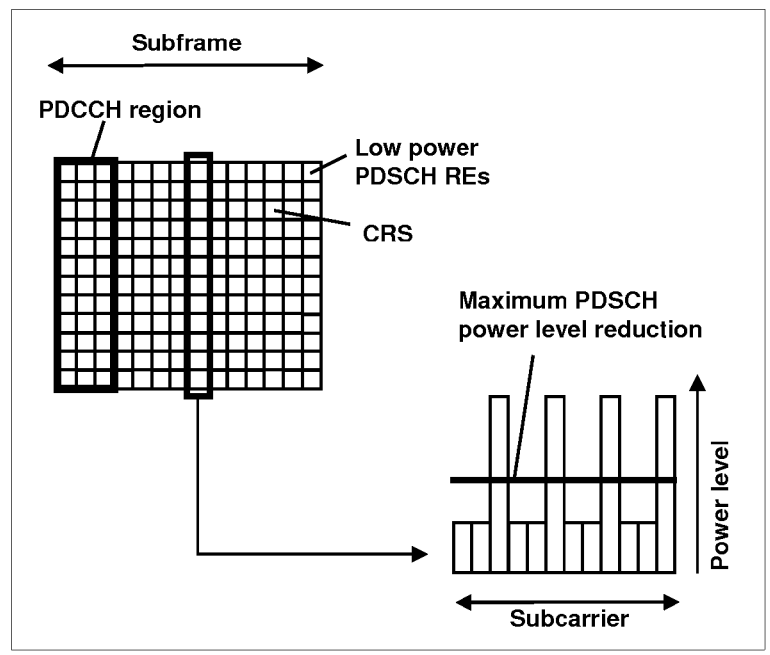
Figure 10:
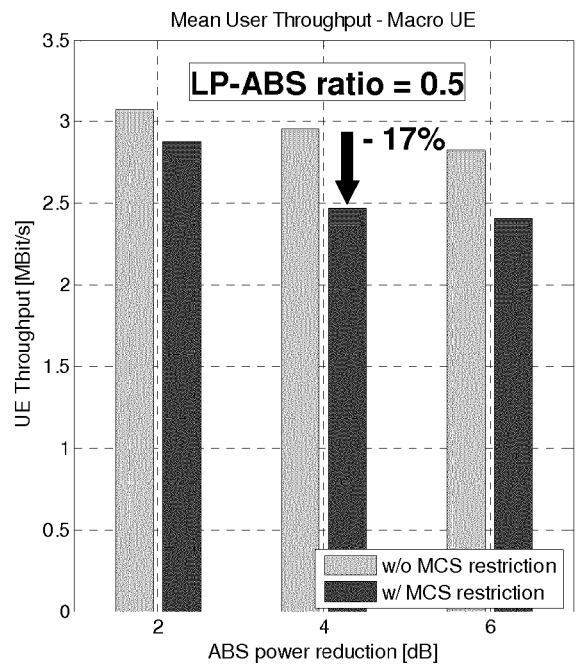
FIG. 10 shows a plot of user equipment (UE) throughput for an LP-ABS ratio of 0.5 (a) and of 0.7 (b) in a typical HetNet scenario as defined in 3GPP LTE.
Figure 10:
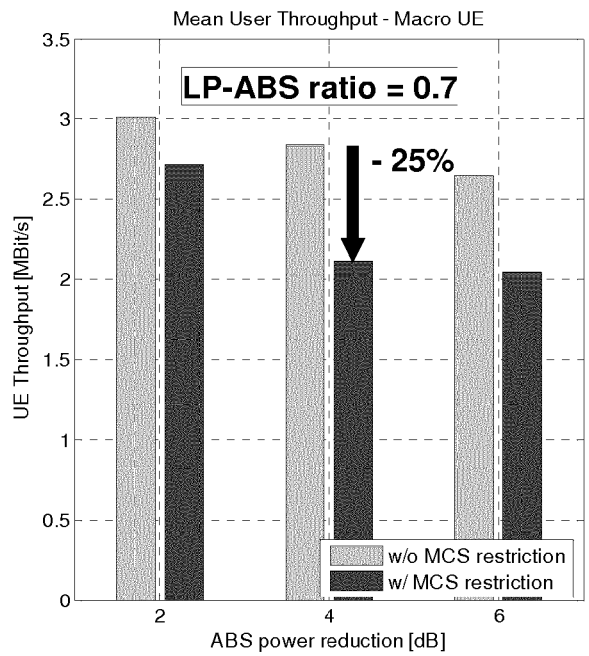
Figure 11A:
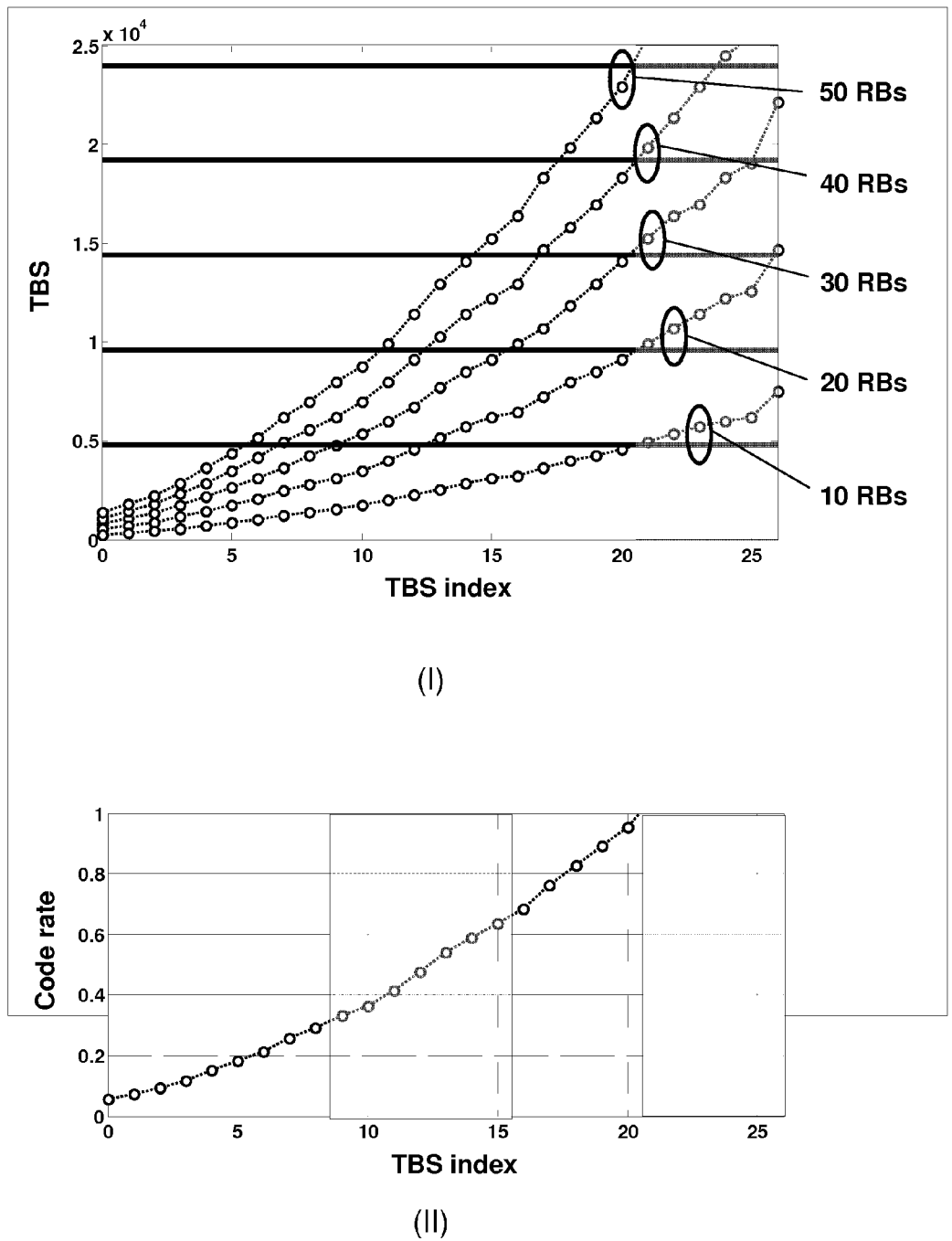
FIG. 11A shows plots illustrating the supported transport block sizes for 16QAM (I) and the supported code rates for 16QAM (II) as defined for 3GPP LTE (release 10)

FIG. 11A shows plots illustrating the supported transport block sizes for 16QAM (I) and the resulting supported code rates for 16QAM (II) as defined for 3GPP LTE (release 10). FIG. 11A (I) shows transport block size TBS in the physical downlink shared channel (PDSCH) depending on the TBS index of the MCS Table 0 in release 10 and the number of aggregated resource blocks (RBs). The plot refers to a subframe having a control region size of 3 OFDM symbols and 2 CRS antenna ports as shown in FIG. 9. However, this is just an example of a possible configuration which is useful for understanding the concept underlying the present invention and does not have to be considered limiting.

The maximum possible TBS under the assumption of 16QAM and 120 usable resource elements (REs) per resource block are indicated in the plot with bold lines. The shaded region indicates the TBS indices supported in 3GPP LTE release 10 for a 16QAM modulation scheme. The maximum achievable code rate is R=1.0 and in this case, the code word does not contain any redundancy. Hence, a code rate of more than 1.0 is not technically possible within this context. Such code rates correspond to TBS indices larger than 21 (grey area in FIG. 11A (II)). Although in systems currently supported by release 10, a 16QAM modulation scheme could possibly be associated with TBS indices spanning from 0 to 21 and supporting code rates up to roughly 1.0, release 10 currently dedicates to a 16QAM modulation scheme only the TBS indices from 9 to 16. This is due to the fact that the remaining TBS indices are associated with other modulation schemes. More precisely, the QPSK modulation scheme (modulation order 2) is associated with TBS indices 0 to 9, while indices 15 to 21 are associated with the 64QAM modulation scheme (modulation order 6).

Figure 11B:
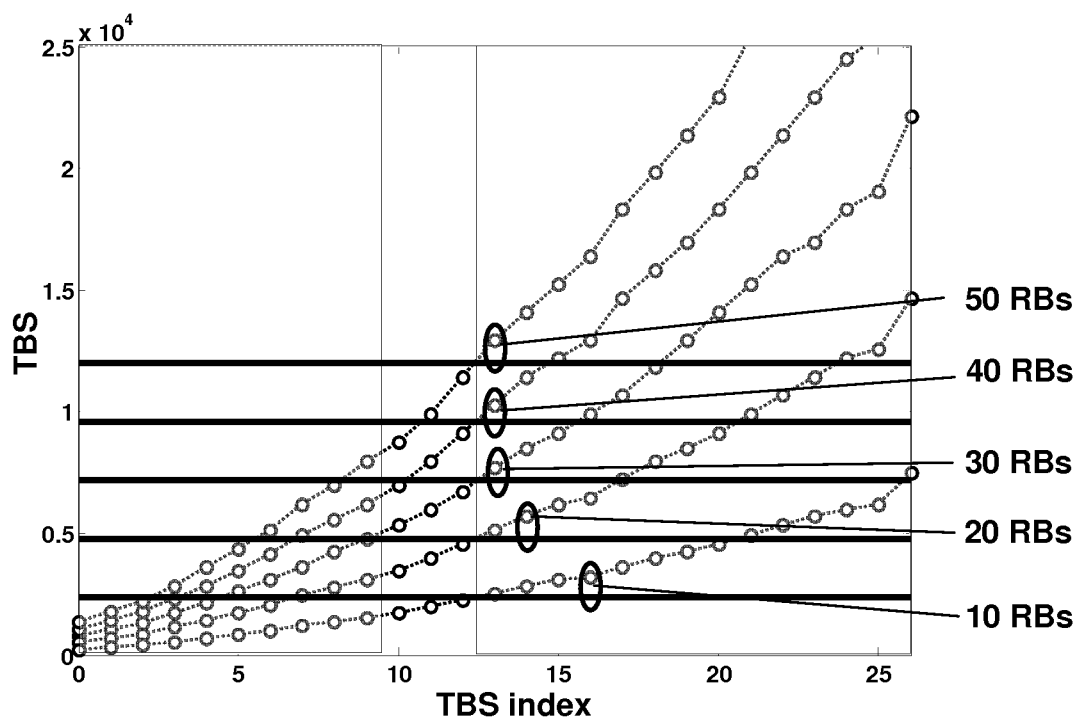
FIG. 11B shows plots illustrating the supported transport block sizes for QPSK (I) and the supported code rates for QPSK (II) as defined for 3GPP LTE (release 10)

FIG. 11B shows plots illustrating the supported transport block sizes for QPSK (I) and the supported code rates for QPSK (II) as defined for 3GPP LTE (release 10).

FIG. 11B (I) shows transport block size TBS in the physical downlink shared channel (PDSCH) depending on the TBS index of the MCS Table 0 in release 10 and the number of aggregated resource blocks (RBs). The plot refers to a subframe having a control region size of 3 OFDM symbols and 2 CRS antenna ports as shown in FIG. 9. However, this is just an example of a possible configuration which is useful for understanding the concept underlying the present invention and does not have to be considered limiting.

The maximum possible TBS under the assumption of QPSK and 120 usable resource elements (REs) per resource block are indicated in the plot with bold lines. The shaded region indicates the TBS indices supported in 3GPP LTE release 10 for a QPSK modulation scheme. The maximum achievable code rate is R=1.0 and in this case, the code word does not contain any redundancy. Hence, a code rate of more than 1.0 is not technically possible within this context. In the above described configuration a code rate CR=1.0 is obtained for TBS indexes above 12 (grey area in FIG. 11B (II)). Although in systems currently supported by release 10, a QPSK modulation scheme could possibly be associated with TBS indices spanning from 0 to 12 and supporting code rates up to roughly 1.0, release 10 currently dedicates to a QPSK modulation scheme only the TBS indices from 0 to 9. This is due to the fact that the remaining TBS indices are associated with the 16QAM modulation scheme.

The present invention is based on the observation that the modulation and coding scheme index used in 3GPP LTE does not exploit, in an optimised manner, the resources of the system and in particular that the standard MCS Table as specified in 3GPP LTE is not optimized based on the PDSCH transmission power level. In particular, levels in the MCS table dedicated to higher level modulations (64QAM modulation schemes) can only be used in the event of good channel conditions; wherein, a good channel condition has to be interpreted in terms of signal to noise and interference ratio. In particular, in low power ABS the 64QAM modulation scheme can not be used due to modulation order restrictions.

The entries of the MCS Table 0 dedicated to higher order modulations, such as 64QAM, which in many network scenarios cannot be efficiently used due to modulation order restrictions, can therefore be used to extend the set of code rates for lower and more robust modulation schemes. The extension of the code rate ranges associated to lower order modulation schemes may be performed taking into account the transmission power of the physical downlink shared channel. Accordingly, in network scenarios implementing low power ABS and PDSCH power reduction, data on the physical downlink shared channel can be modulated according to the MCS Table and according to the transmission power of the eNodeB in the macro cell.

FIGS. 12 and 13 illustrate an example of MCS tables applicable for the physical downlink shared channel transmission.

In the MCS Table 1 in FIG. 12 entries 17 to 22 may be set to modulation order Qm=4, corresponding to the 16QAM modulation scheme. In contrast, the MCS Table 0, also referred to as reference table for simplicity, has 32 entries with indices 0 to 31, of which entries 17 to 21 are dedicated to the modulation order Qm=6, corresponding to a 64QAM modulation scheme. In the present invention, the entries of MCS Table 1 dedicated to the 64QAM modulation scheme are restricted to 6 levels, corresponding to the entries 23 to 28. Consequently, 13 levels of MCS Table 1 are dedicated to the modulation order 4, instead of the 7 levels usually dedicated to this modulation order in the standard LTE MCS table.

The TBS indices 15 to 20, which in a common LTE MCS table are associated with the modulation order 6, are now associated with the modulation order 4. The modulation order restrictions for subframes with reduced PDSCH transmission power prevent using the 64QAM modulation scheme but still allows using the 16QAM modulation scheme. As a consequence, the 16QAM modulation scheme, which can be efficiently used for modulating subframes without exceeding a given EVM margin on the transmitter side, will support transport block sizes that are commonly associated with higher modulation orders; and, therefore, not usable in low power PDSCH transmissions. This has the advantage of increasing the throughput of the terminals in served by the macro eNodeB.

As an example, the code rates associated with some of the entries dedicated to modulation order 4 in MCS Table 1 are shown in FIG. 12. Entry 10 of MCS Table 1 is associated with a code rate CR=0.33. In a common LTE MCS table the modulation order 4 is set up to entry 16, which corresponds to a TBS index 15, giving a code rate CR=0.63. Further, entries 17 to 22, previously dedicated to the 64QAM modulation scheme, are set so as to correspond to a modulation order 4, In this manner, the last entry set to the modulation order 4 is associated to the TBS index 20, giving a code rate CR=0.97.

MCS Table 0 commonly used in LTE only reserves for the modulation order 4 the entries 10 to 16, corresponding to a maximum obtainable code rate CR=0.63 for the 16QAM modulation scheme. Therefore, in low power PDSCH transmissions using MSC Table 1 results in an increase in the highest supported code rate for the 16QAM modulation scheme from 0.63 to 0.97.

Although MCS Table 1 only extends the modulation order 4 to entry 22, it might be, in principle, possible to further increase the number of supported code rates for this modulation order by setting one or more of the entries 23 to 28 to modulation order 4. The possibility of using entries 23 to 28 associated with the modulation order 4 may depend on (a) the EVM value on the transmitter side and/or (b) on the code rate obtained by using transport blocks corresponding to the TBS indices 21 to 26, in combination with the modulation order 4.

According to an embodiment of the present invention the MCS Table 1 may be further modified by setting the modulation order for all MCS indexes above 10 to modulation order 4.

Alternatively, in addition to increasing the code rates for a certain modulation order, it can in certain scenarios also be beneficial to provide smaller code rates for a certain modulation order, meaning in the example shown in FIG. 12 that one or more MCS indexes below 10 could also be set to modulation order 4.

A further example is to set the modulation order for all MCS indexes in the MCS table 1 to modulation order 4.

MCS Table 1 in FIG. 12 may, for instance, be efficiently used for PDSCH transmissions in subframes with power reduction between 0 and 3dB so as to comply with the current requirements for the EMB specified in 3GPP TS 36.104, "Evolved Universal Terrestrial Radio Access (E-UTRA): Base Station (BS) Radio Transmission and Reception" version 10.5.0, section 6.

FIG. 13 shows an MCS table that addresses the extension of QPSK code rates (MCS Table 2). In this case, the modulation order corresponding to the entries 10 to 13 of the MCS table is set to 2 (corresponding to the QPSK modulation scheme). Accordingly, the supported code rates for QPSK are extended while the number of supported code rates for a 16QAM modulation scheme is reduced. The reduction of the entries dedicated to the 16QAM modulation scheme does not have any negative influence on the transmission efficiencies in subframes with large PDSCH power level reductions, since in this case, the 16QAM modulation scheme could not be efficiently used due to modulation order restrictions (for more details on the modulation order restrictions referred to, please see 3GPP TS 36.104, "Evolved Universal Terrestrial Radio Access (E-UTRA): Base Station (BS) Radio Transmission and Reception" version 10.5.0).

MCS Table 2 extends, therefore, the number of entries dedicated to a usable modulation order for a given PDSCH transmission power level, thereby increasing the maximum achievable code rate.

FIG. 13 further shows, as an example, the code rates associated with some of the entries dedicated to modulation order 2. Entry 0 of table 2 is associated with a code rate CR=0.11. In a common LTE MCS table the modulation order 2 is set up to entry 9, which corresponds to a TBS index 9, giving a code rate CR=0.65. Further, entries 10 to 13 dedicated in MCS Table 0 to the 16QAM modulation scheme, are set so as to correspond to a modulation order 2. In this manner, the last entry set to the modulation order 4 is associated to the TBS index 12, giving a code rate CR=0.94.

MCS Table 0 commonly used in LTE only reserves for the modulation order 2 the entries 0 to 9, corresponding to a maximum obtainable code rate CR=0.65 for the QPSK modulation scheme. Therefore, in low power PDSCH transmissions using MSC Table 2 results in an increase in the code ratio for the QPSK modulation scheme from 0.65 to 0.94.

According to the current eNB requirement specifications, as given in 3GPP TS 36.104, "Evolved Universal Terrestrial Radio Access (E-UTRA): Base Station (BS) Radio Transmission and Reception" version 10.5.0., table 2 in FIG. 13 might be used for PDSCH transmissions in subframes with power reduction between 3 and 6 dB.

In an alternative realisation of the MCS Table 2 in FIG. 13, entries 10 to 28 may be set to modulation order 2 in order to exploit a wider range of code rates. Usage of higher level entries will then depend on (a) the EVM values on the transmitter side and/or (b) code rate values (the code rates may not be higher than 1.0).

A further example is to set the modulation order for all MCS indexes in MCS table 2 to modulation order 2.

In MCS Table 1 as well as in MCS Table 2, the modulation order is associated with an expanded range of TBS indices; and therefore, to an extended range of code rates, based on the transmission power of the subcarriers. In particular, MCS Table 1, where the modulation order 4 is associated also with the TBS indices 15 to 20, may be used in case the PDSCH transmission is performed in subframes with a power level reduction between 0 and 3 dB. Similarly, MCS Table 2, where the modulation order 2 is associated with TBS indices 9 to 12, may be used for PDSCH transmissions in subframes with power reductions between 3 and 6 dB.

Here, power reduction is to be intended in relation to the standard transmission power level for an eNB in a macro cell. It is to be understood that the power reduction levels referred to with reference to MCS Table 1 and MCS Table 2, may also lie in different ranges than the one described above, depending on the network scenario and on the implementation of the system.

According to a further embodiment, the MCS table may be modified so as to support extensions for both QPSK and 16QAM code rates. An example of such a table (MCS Table 3) is shown in FIG. 14. MCS table 3 is a combination of the MCS tables of FIGS. 12 and 13. As can be seen from FIG. 14, entries (MCS index) 10 to 12 are set to 2 and the corresponding TBS indices span between 10 and 12. In addition, entries 20 to 24 are set to 4 and associated with the TBS indices 16 to 20. The code rates supporting the modulation order 2 and 4 of table 3 are the same as those supported by MCS table 1 and MCS table 2, respectively, and span from 0.11 to 0.94 for modulation order 2 and from 0.33 to 0.97 for modulation order 4.

The MCS table 3 can be used according to the current restrictions given in 3GPP TS 36.104 for PDSCH power level restrictions between 0 and 6 dB. The use of an MCS table including an extension for QPSK and 16QAM code rates may be advantageously used in systems and network scenarios supporting dynamic changes of the PDSCH transmission power level, or in other words, a dynamic power reduction.

MCS Table 1 and MCS Table 2 may be implemented independently as a replacement for MCS Table 0. Alternatively, MCS Table 1 and MCS Table 2 may be implemented conjunctively, or as an alternative to MCS Table 0 in order to support a range of power reduction in PDSCH transmissions between 0 and 6 dB.

Figure 15:
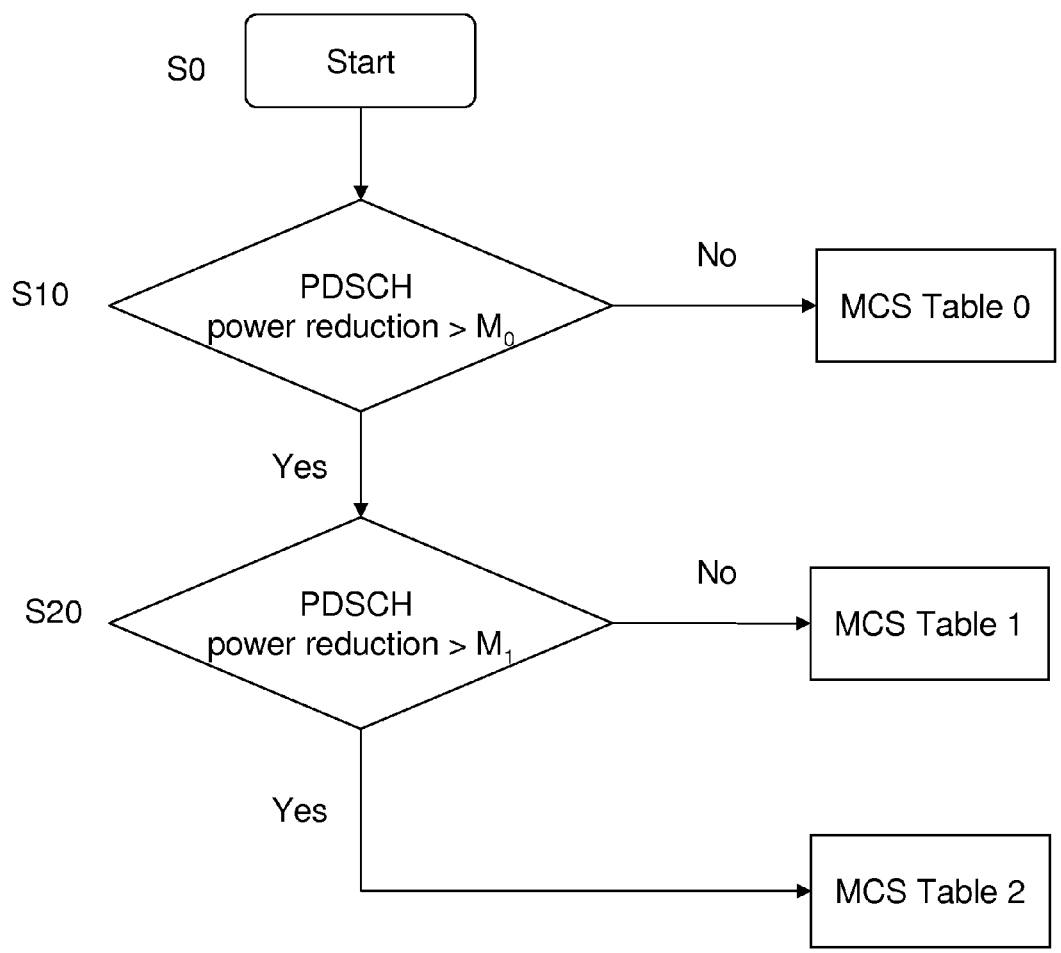
FIG. 15 is a flow diagram describing a selection method for an MCS Table in a LP-ABS HetNet environment as defined in 3GPP LTE.

According to an embodiment of the present invention, MCS table 0 to MCS table 2 may all be used to determine the more appropriate modulation order and coding scheme in a physical downlink shared channel. Accordingly, the MCS table to be referred to in downlink transmissions may be implicitly determined based on the PDSCH power level reduction. FIG. 15 shows a flow chart describing an MCS table selection based on the power level of the PDSCH transmission. In particular, the PDSCH power level may be determined and compared to the maximum PDSCH power level so as to derive a PDSCH power reduction level. The so calculated power reduction level may then be compared, at step s10, to a first threshold value $M_0$ and if the PDSCH power reduction does not exceed the first threshold value $M_0$ the MCS tale 0 is used for determining the modulation and coding scheme. In this case, the data is transmitted at maximum power and MCS table 0 can be efficiently used. In the case that the PDSCH power reduction value exceeds the first threshold value $M_0$, the transmitted data is determined to be low power ABS; and therefore, one of MCS table 1 or MCS table 2 is to be used. Under step s20, the PDSCH power reduction is compared to a second threshold value $M_1$. In the case that the PDSCH power reduction does not exceed the second threshold value MCS table 1 is considered to determine the modulation and coding scheme to be used for the data transmission; otherwise MCS table 2 is chosen.

The structure and number of the MCS Tables and the choice of the threshold values described above does not have to be considered limiting at all. In particular, the concepts above can be extended by the definition of further MCS tables and corresponding decision thresholds.

Alternatively, the appropriate MCS table to be used can be directly indicated by the eNB.

Accordingly, a base station such as an eNB may directly inform a terminal, such as a user equipment (UE) about which MCS table has to be used for which subframe set. According to this embodiment, the terminal may know about the existence of different subframe sets. For instance, a normal subframe (transmitted at maximum power), low power-ABS subframe with a power reduction up to a threshold value $M_0$, and low power ABS subframes with a power reduction in the range between $M_0$ and $M_1$. Accordingly, a base station may send to a terminal linking information that links a subframe set to a respective MCS table. Such linking information may be configured semi-statically by the eNB and transmitted to the terminal via RRC signalling. An example of an RRC signal linking a subframe set with a corresponding MCS table is shown below:

tableMCS-subframeSet-A::=
    ENUMERATED {table-0, table-1, table-2, table-3}
tableMCS-subframeSet-B::=
    ENUMERATED {table-0, table-1, table-2, table-3}.

An advantage of using the MCS tables 1 and 2 is that the only entries that have to be modified, with respect to the currently used LTE MCS table, are, respectively, entries 17 to 22 for table 1 and entries 10 to 13 for table 2. This ensures a high backward compatibility with actual 3GPP LTE implementations in current network scenarios.

A further advantage of the scheme is that different eNB vendors can differentiate by supporting different MCS tables depending on their implementation. The current LTE specification restricts all eNB implementations to using the same single MCS table in all subframes independent of the certain conditions such as PDSCH transmission power or channel conditions.

Again, the number of MCS Table discussed in relation to the previous embodiments has to be considered as an example for understanding the principles of the invention. The set of defined MCS tables does not have to be restricted to four tables. The definition of further MCS tables for an increased set of lower code rates can also be supported.

According to the current LTE restrictions (for more details refer to 3GPP TS 36.104, "Evolved Universal Terrestrial Radio Access (E-UTRA): Base Station BS Radio Transmission and Reception", version 10.5.0), the first threshold value may be set to $M_0=0$ dB and the second threshold value may be $M_1=3$ dB. It is to be understood that these particular values depend on the network scenario, the implementation of the system, and the requirement in 3GPP TS 36.104. However, such values do not have to be considered limiting in any way, and might be modified in order to fulfil different requirements and comply with different network configurations.

In addition to the MCS Tables also the Channel Quality Indicator (CQI) may be adapted so for coherency with the changes applied to the MCS Tables. Accordingly, to each of the implemented MSC Tables should be associated a corresponding CQI table configuration.

MCS Table 0 may be associated to table 5 below (CQI Table 0), which is the table currently used for LTE (release 10):

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |

TABLE 5-continued

| CQI index | modulation | code rate × 1024 | efficiency |
|---|---|---|---|
| 13 | 64QAM | 772 | 4.5234 |
| 14 | 64QAM | 873 | 5.1152 |
| 15 | 64QAM | 948 | 5.5547 |

MCS Table 1, supporting the 16QAM extension may be associated to table 6 (CQI Table 1) below:

TABLE 6

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 16QAM | 699 | 2.7305 |
| 11 | 16QAM | 851 | 3.3223 |
| 12 | 16QAM | 999 | 3.9023 |
| 13 | 64QAM | 772 | 4.5234 |
| 14 | 64QAM | 873 | 5.1152 |
| 15 | 64QAM | 948 | 5.5547 |

Entries 10 to 12 of CQI Table 1 have been changed with respect to CQI Table 0 according to the new entries of MCS Table 1.

MCS Table 2, supporting the QPSK extension may be associated to table 7 (CQI Table 2) below:

TABLE 7

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | QPSK | 756 | 1.4766 |
| 8 | QPSK | 980 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Entries 7 and 8 of CQI Table 2 have been changed with respect to CQI Table 0 according to the new entries of MCS Table 2.

If the MCS table definition comprises also the support of lower code rates instead of just higher code rates, the corresponding CQI table may also be adapted accordingly.

Figure 16:
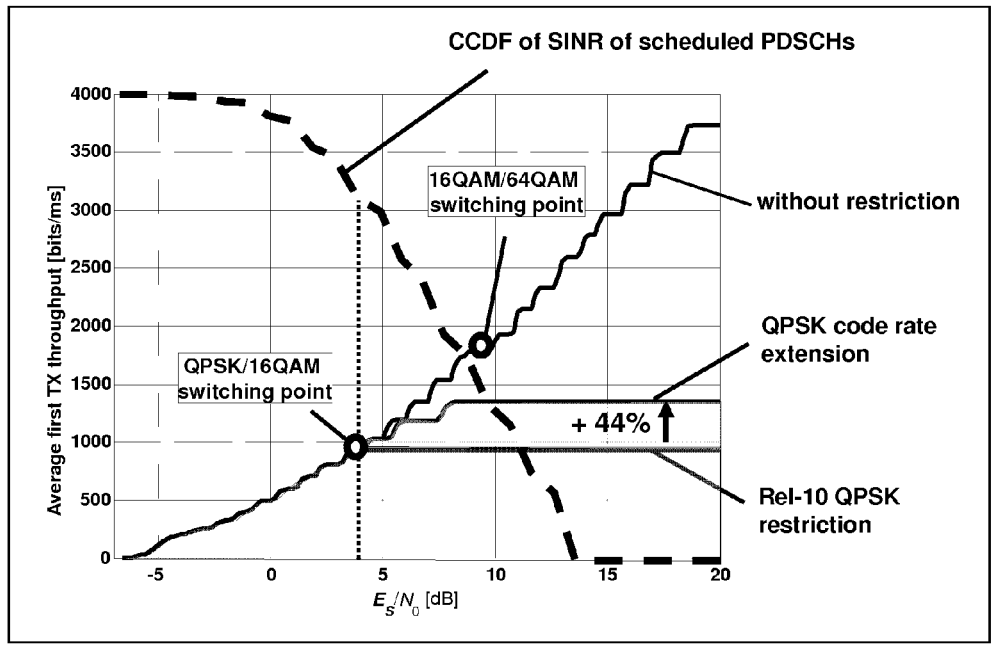
FIG. 16 is a plot illustrating the gain in UE throughput while implementing a modulation and coding scheme index with a QPSK code rate extension (a), and when implementing a modulation and coding scheme index in downlink supporting 16QAM code rate extension (b)
Figure 16:
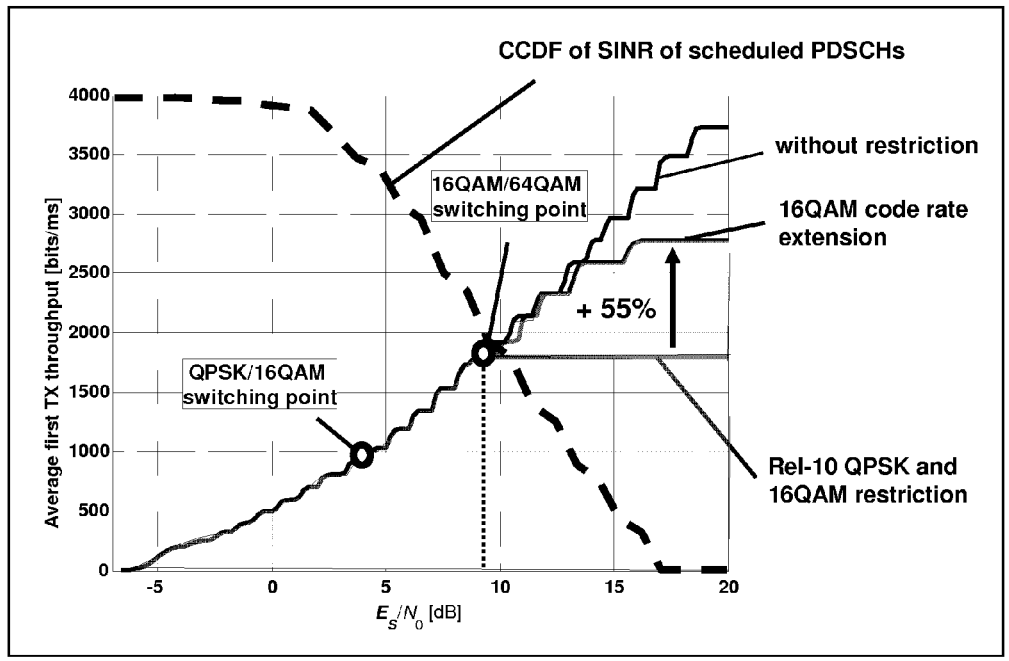

FIG. 16 shows plots describing the effect of the use of the MCS table of FIGS. 12 and 13 in low power ABS transmission. FIG. 16(a) shows the code rate based on link-level simulations in the event of PDSCH power reduction between 3 and 6 dB. The solid lines indicate the average throughput as a function of the SINR (Signal to Noise plus Interference Ratio). In particular, the solid dark grey line indicates the throughput obtained using the currently implemented LTE MCS table as defined in 3GPP LTE release 10. The black solid line shows the average throughput obtained using the MCS table supporting the QPSK code rate extension (MCS Table 1). As can be seen from the plot, implementation of the MCS Table 1 would lead to an increase of 44% in the maximum supported throughput with respect to the current LTE implementation. The dashed line is a cumulative distribution function (CCDF) of the signal to interference and noise ratio of scheduled physical downlink shared channels, and is an indication of how many user equipments would benefit from the extended code rates. Accordingly, approximately 75% of user equipment in a macro cell and scheduled in low power ABS would experience up to 44% throughput gain in the evaluated scenario.

FIG. 16(b) shows the same plots described with reference to FIG. 16(a) for PDSCH transmissions restricted to QPSK and 16QAM for a PDSCH power reduction up to 3 dB. The solid black line shows the average throughput obtained by using the MCS table supporting the 16QAM code rate extension (MCS table 2). The use of MCS table 2 provides for a gain of 55% in the average throughput. In particular, the CCDF of the SINR of the scheduled PDSCHs calculated based on system-level simulations shows that approximately 50% of the user equipments in the macro cell which are scheduled in low power ABS, experience up to 55% throughput gain.

For comparison, the light grey solid line in FIG. 16(a) and (b) show the theoretical average throughput obtainable without restricting the modulation orders by excluding the 64QAM modulation scheme (modulation order 6).

Figure 17:
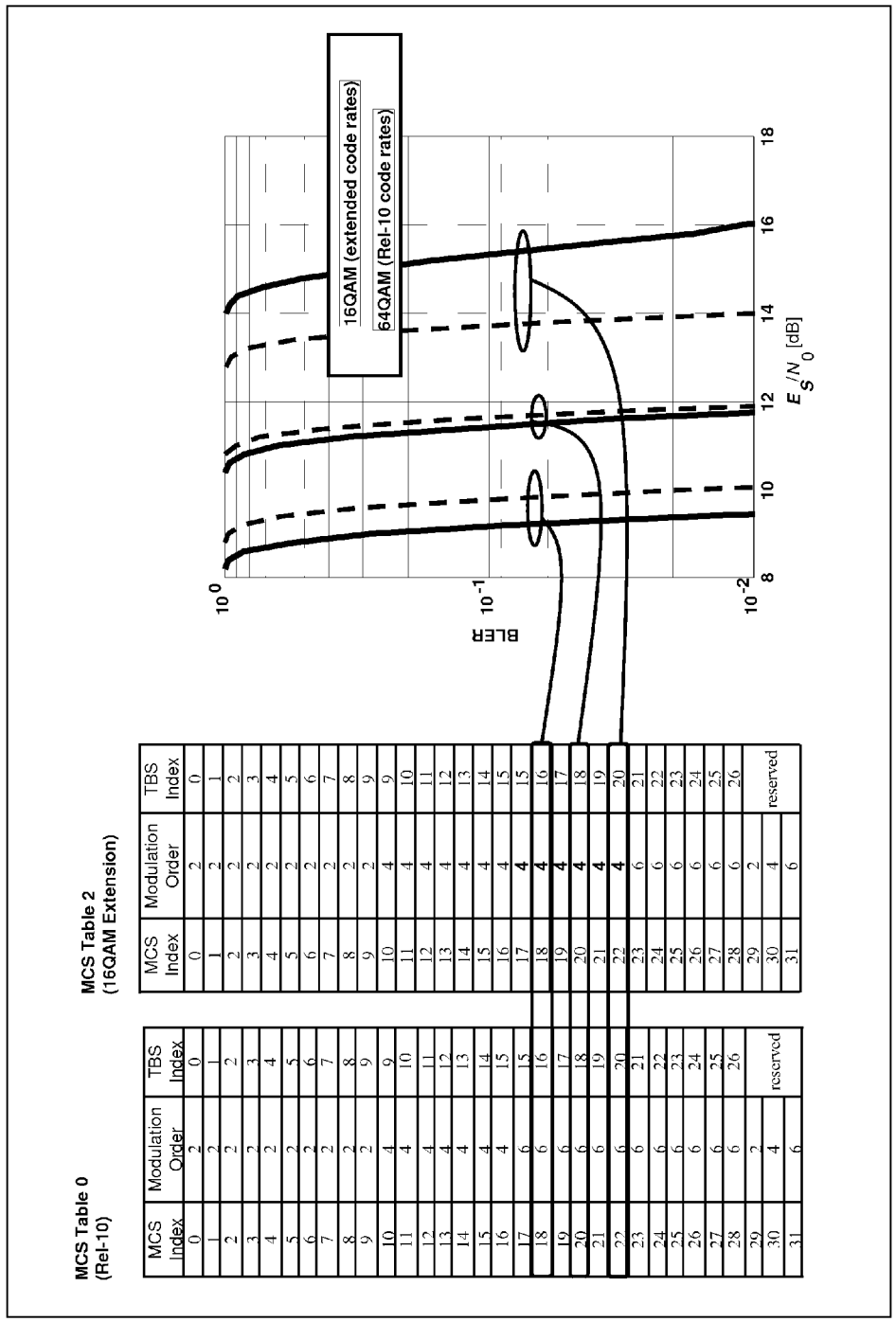
FIG. 17 illustrates the block error rate (BLER) obtained when using the MCS table supporting 16QAM extension and using the standard MCS table as defined in 3GPP LTE, release 10.

FIG. 17 shows the result of a link-level simulation study measuring the block error rate (BLER) showing the proportion of received data blocks which are decoded erroneously. In the simulation study additive White Gaussian Noise (AWGN) has been added to simulate interference and 6 resource blocks, each with 120 PDSCH resource elements, having 3 control region symbols and 2 cell specific reference signal ports were considered. As can be seen, for moderate 16QAM code rate extensions, the results obtained using the 16QAM modulation scheme according to the MCS table 2 outperform the results obtained using a higher modulation scheme (64QAM) according to the current LTE MCS table at the same spectral efficiency.

Although the above description refers to MSC table for the downlink, the same concept can be easily extended and applied to the MCS table for the uplink.

Figure 11B:
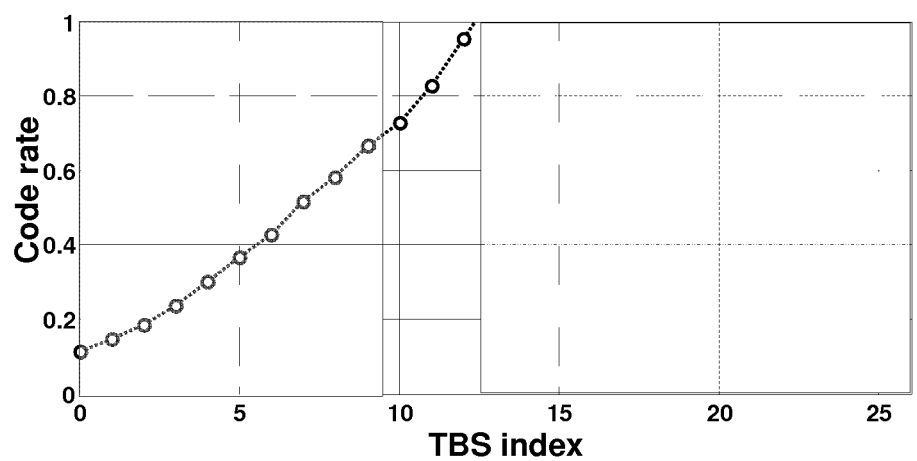
Figure 18:
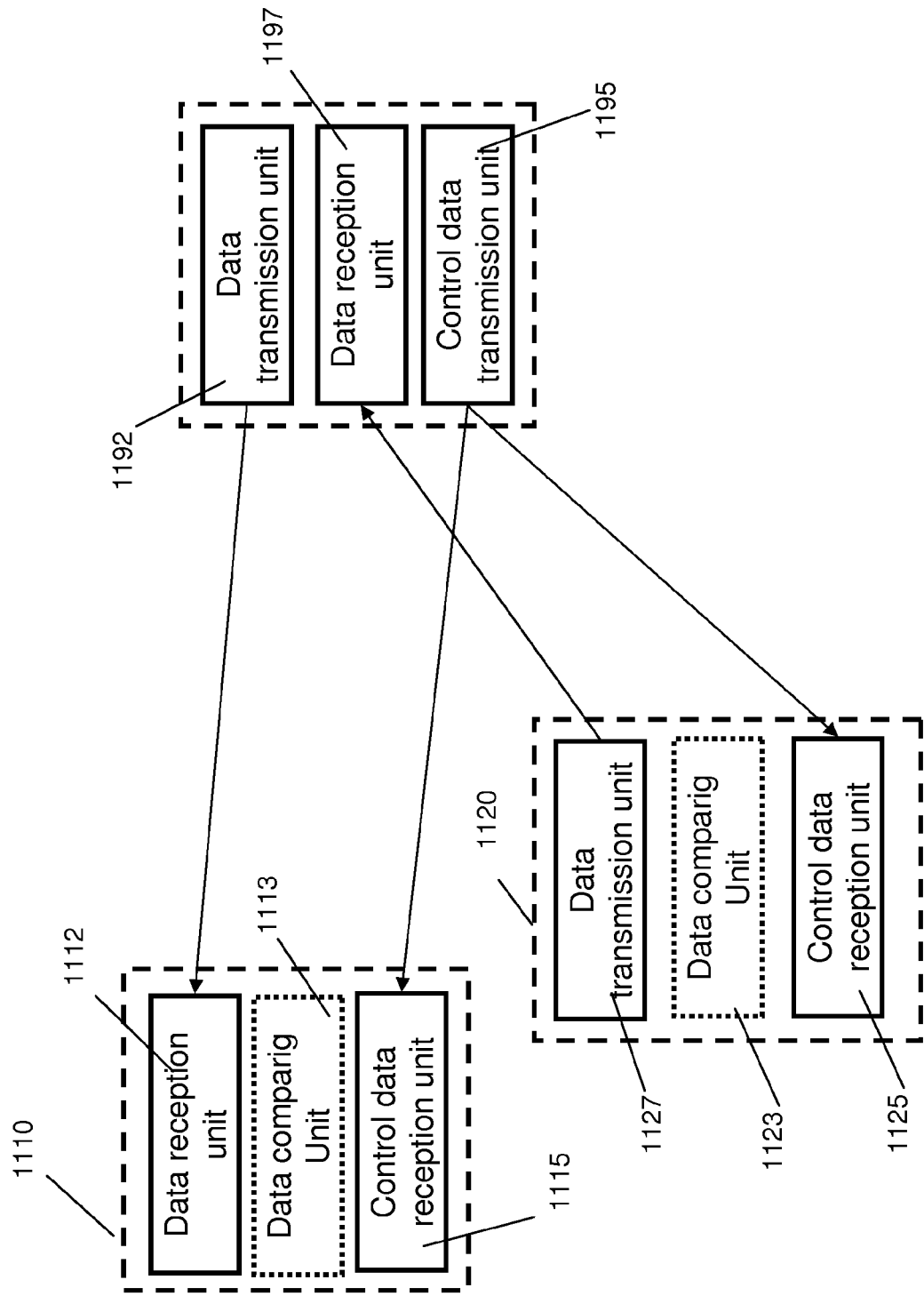
FIG. 18 is a block diagram illustrating an example of apparatuses according to various embodiments of the invention.

FIG. 18 illustrates examples of devices in accordance with the present invention. In particular, FIG. 11 shows two terminals 1110 and 1120. The terminal 1110 is a terminal capable of transmitting data coded in low-power ABS in the downlink. The terminal 1120 is a terminal capable of transmitting data coded in low-power ABS in the downlink in the uplink. As is clear to those skilled in the art, a single terminal may be provided capable of applying bundling in both uplink and downlink direction. Such terminal would then include the functional blocks of both terminals 1110 and 1120. FIG. 18 further shows a scheduling node 1190. The scheduling node 1190 schedules the transmission and reception of data by the terminals. The scheduling node may be a network node such as a base station or a radio network controller or the like and in particular an eNodeB serving a macro cell in a HetNet. For instance, in LTE the eNodeB performs the dynamic scheduling for the shared channels in downlink (PDSCH) and in uplink (PUSCH). However, it is noted that in general, in LTE or other systems the scheduling may be performed by a different node or for other downlink or uplink channels, which is still no problem for the employment of the present invention in such a system.

In accordance with an embodiment of the present invention, a terminal 1120 is provided for transmitting data in a multicarrier communication system in which the transmission of data is performed in transmission time intervals. The terminal 1120 includes a control information reception unit 1125 for receiving scheduling information indicating resources on which the terminal is scheduled to transmit data, and including a set of modulation and coding indicators for indicating the modulation scheme and the size of the data according to which data is to be transmitted. Moreover, the terminal comprises a data transmission unit 1127 for transmitting the data in the scheduled resources and in accordance with the received modulation and coding indicator and according to a transmission parameter of the data to be transmitted. In particular the transmission parameter may be used for selecting the modulation and coding scheme to be used for coding data to be transmitted.

In accordance with another embodiment of the present invention, a terminal 1110 is provided for receiving data in a multicarrier communication system, in which the reception of data is performed in transmission time intervals. Such a terminal 1110, similarly to the terminal 1120, for receiving scheduling information indicating resources on which the terminal is scheduled to transmit data, and including a set of modulation and coding indicators for indicating the modulation scheme and the size of the data according to which data is to be transmitted. Moreover, the terminal comprises a data transmission unit 1127 for transmitting the data in the scheduled resources and in accordance with the received modulation and coding indicator and according to a transmission parameter of the data to be transmitted. In particular the transmission parameter may be used for selecting the modulation and coding scheme to be used for coding data to be transmitted.

The transmission parameter may be for instance the transmission power at which the data are transmitted. Alternatively, the transmission parameter may be linking information capable of linking a particular subframe set to a corresponding modulation and coding scheme indicator.

The modulation and coding indicator set, for instance one or more of MCS Table 0 to MCS Table 3, may be included in the scheduling information. The modulation order field and the TBS index may be a separate field or bit within a modulation and coding indicator. Alternatively, the modulation order field and the TBS index may be implemented as a single field.

The modulation and coding indicator may be semi-statically chosen among the received modulation and coding indicator set by comparing, at a comparing unit 1113 or 1123 the power level at which the data are to be received or transmitted. This can be done according to the steps described in relation to FIG. 15. However this is not to limit the present invention. In particular, the comparing unit 1113 or 1123 is optional and terminals according to the present invention may be realized without said comparing unit. Alternatively, the comparison may be performed at the reception unit 1115 or 1125. The comparing unit 1113 or 1123 or alternatively the reception unit 1115 or 1125 may further be adapted to select the appropriate modulation and coding indicator according to one of the methods of the present invention.

Alternatively, the modulation and coding indicator may be signalled to the terminal 1110 or 1120 by a semi-static configuration, such as a RRC configuration. In particular, the appropriate MCS table to be used can be directly indicated by the eNB. Accordingly, a base station such as an eNB may directly inform a terminal, such as a user equipment (UE) about which MCS table has to be used for which subframe set. Accordingly, the terminal may know about the existence of different subframe sets. For instance, a normal subframe (transmitted at maximum power), low power-ABS subframe with a power reduction up to a threshold value $M_0$, and low power ABS subframes with a power reduction in the range between $M_0$ and $M_1$. The scheduling node 1190, which is an example of a base station, may send to the terminal 1110 and 1120 linking information that links a subframe set to a respective MCS table. Such linking information may be configured semi-statically by the scheduling node 1190 and transmitted to the terminal via RRC signalling. An example of an RRC signal linking a subframe set with a corresponding MCS table has been already discussed above.

However, this is not to limit the present invention. In alternative embodiments the linking indicator does not have to be necessarily configured by the RRC. Any other type of signalling may be used. The term semi-statically here refers to the fact that the signalled value applies for more than one scheduled transmission and or reception.

In a further alternative realization, the set of modulation and coding indicators may include only one modulation and coding indicator. In such a case the MCS table 3 may be used and the appropriate modulation order and the associated data size information supported by the MCS Table 3 may be chosen according to the transmission parameter of the data scheduled to be transmitted and described above.

The terminal may be a mobile or a static terminal. However, the terminal may also be a normal user terminal or a relay node. The multicarrier communication system may be a wireless communication system supporting orthogonal frequency division modulation (OFDM), such as LTE. However, the present invention is not limited thereto and modulation and coding scheme of the present invention may be applied to any communication system supporting dynamic scheduling on a shared data or control channel. The transmission time interval here refers to a predefined processing time interval in which the data are provided to the physical layer for transmission in a subframe (predefined duration on a radio interface). For instance, the length of the TTI in LTE is one millisecond and one TTI is mapped on the physical resources of one subframe as already described in the background section. It is noted that these values apply for the current LTE specifications. However, the present invention is applicable for any timing of the radio interface.

Figure 19:
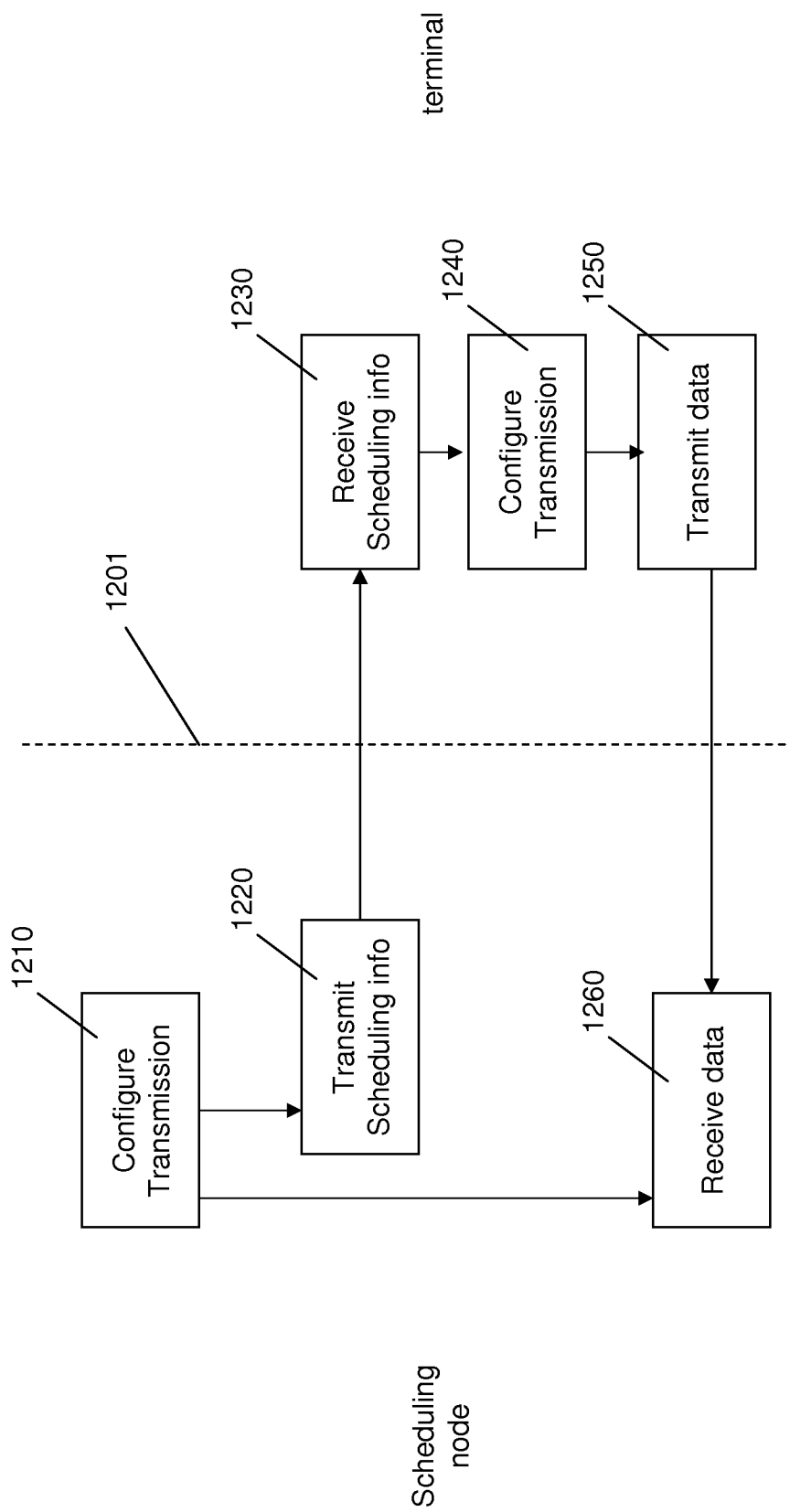
FIG. 19 is a flow diagram illustrating uplink data transmission involving methods according to the present invention.
Figure 20:
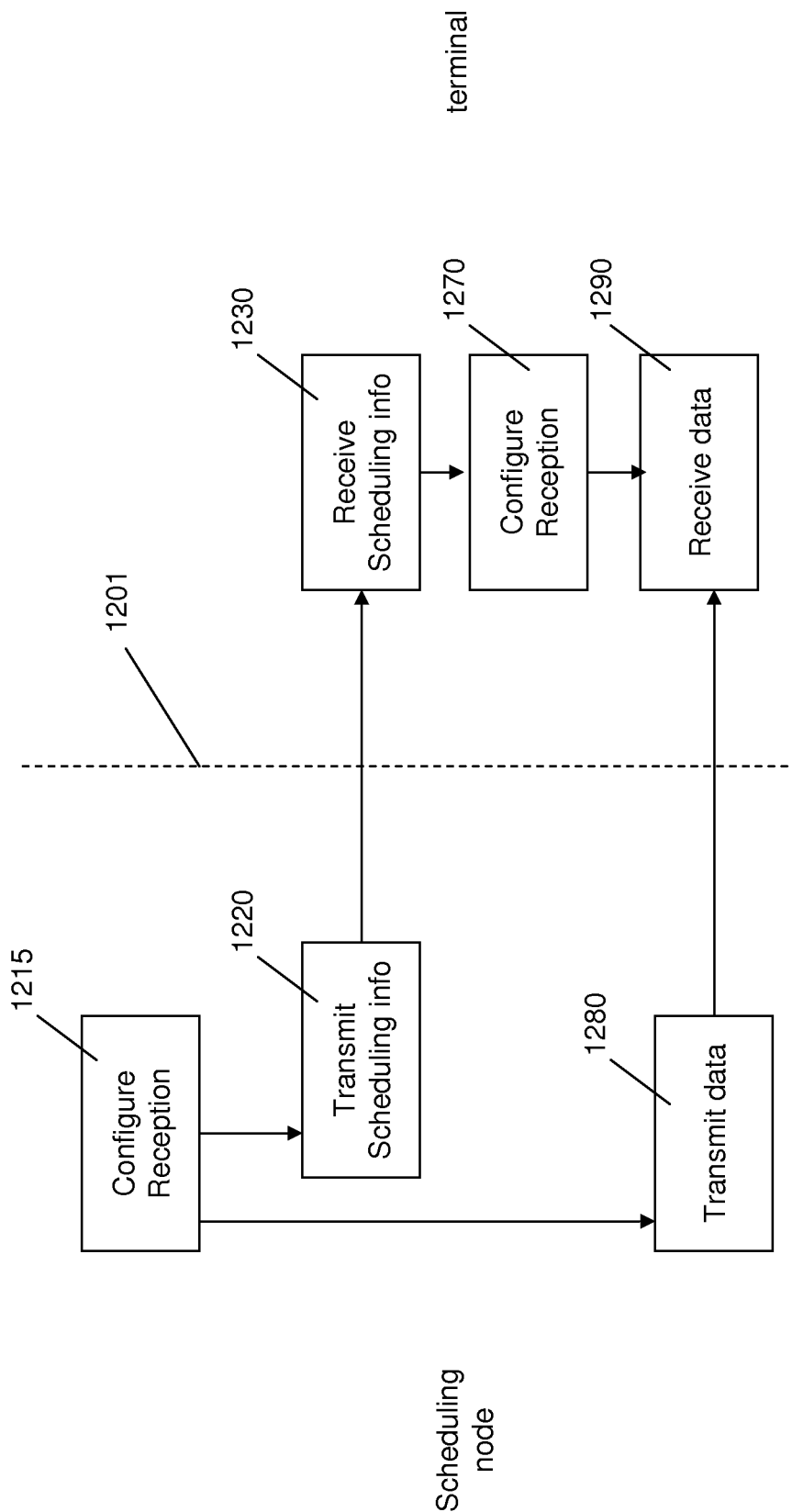
FIG. 20 is a flow diagram illustrating downlink data transmission involving methods according to the present invention.

The present invention further provides methods for transmission and reception of data. Some examples of the methods are illustrated in FIGS. 19 and 20. These methods may be performed alone or in combination. Further, these methods may also be carried out in combination to the selection method described with reference to the flow chart of FIG. 15.

In particular, a method is provided for transmitting and/or receiving data in a multicarrier communications system, transmission and/or reception of data being performed in transmission time intervals. The method is to be performed at a scheduling node and comprises transmitting 1220 scheduling information, which indicates resources on which a terminal is scheduled to transmit or receive data and including scheduling information indicating resources on which the terminal is scheduled to transmit data, and including a set of modulation and coding indicators for indicating the modulation scheme and the size of the data according to which data is to be transmitted. The method further includes transmitting 1280 and/or receiving 1260 the data in the scheduled resources (over a channel 1201) to/from the terminal in accordance with the transmitted modulation and coding indicator and on a transmission parameter of the data to be transmitted/received 1210, 1215. It is noted that FIGS. 19 and 20 show a step of configuring 1210, 1215 the terminal transmission or reception of data (corresponding to configuring the scheduling node own reception and transmission of data respectively). This step may be a part of scheduling performed by the scheduling node and may include selection of the resources and judging which modulation and order indicator has to be chosen among the set of modulation and coding indicators. The configuring step provides a result (configuration) to the terminal via transmission. On the other hand, the scheduling node also handles according to this configuration 1260, 1280, i.e. transmits or receives data in the configured resources.

Although in the embodiments considered above the MCS tables have been described with reference to subframes. It has to be understood that the concepts above and the principles of the invention can be also applied to subbands. In particular, it has to be understood that several MCS tables, for instance adapted to take into account varying transmission powers, could be designed and associated to different corresponding subbands.

Moreover, the principles described above can be applied to any communication system, such as multicarrier communication systems.

The explanations given in the Technical Background section above are intended to better understand the specific exemplary embodiments described herein and should not be understood as limiting the invention to the described specific implementations of processes and functions in the mobile communication network such as a network compliant with the 3GPP standards. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Summarizing, the present invention relates to transmitting and receiving data in a multicarrier communication system in which the transmission and reception may be performed on a transmission time interval basis. In particular, data are transmitted based on a set of modulation and coding indicators which are chosen according to a transmission parameter of the data to be transmitted. At least one modulation and coding indicator in the modulation and coding indicator set may be designed so as to support an extended range of data dimension information for a given modulation order with respect to the data dimension information associated to the same modulation order in the modulation and coding indicator as specified in the 3GPP LTE, release 10 (reference modulation and coding indicator). This results in an extended range of code rates that can be used in combination with usable modulation schemes, such as QPSK or 16QAM, and in an increased throughput and a reduced SNR at the terminal side.

The invention claimed is:

1. A terminal apparatus for transmitting data in a communication system, the terminal apparatus comprising:
   a receiver which, in operation, receives scheduling information from a scheduling node, the scheduling information indicating resources on which the terminal apparatus is scheduled to transmit data, the scheduling information including a set of modulation and coding indicators;
   a processor which, in operation, selects a modulation and coding indicator out of the received set of modulation and coding indicators; and
   a transmitter which, in operation, transmits the data modulated and coded in accordance with the selected modulation and coding indicator to the scheduling node on the scheduled resources in accordance with a transmission power value of the data,
   wherein,
   when the transmission power value indicates a higher transmission power, a reference set of modulation and coding indicators is included in the scheduling information, and
   when the transmission power value indicates a lower transmission power, a first set of modulation and coding indicators is included in the scheduling information, the first set of modulation and coding indicators including at least one modulation and coding indicator indicative of a modulation order lower than a modulation order indicated by the same modulation and coding indicator in the reference set of modulation coding indicators.

2. A scheduling node apparatus for receiving data from a terminal apparatus, the scheduling node apparatus comprising:
   a transmitter which, in operation, transmits to the terminal apparatus scheduling information indicating resources on which the scheduling node apparatus is scheduled to receive data from the terminal apparatus, the scheduling information including a set of modulation and coding indicators; and
   a receiver which, in operation, receives the data modulated and coded in accordance with a modulation and coding indicator, which is selected by the terminal apparatus out of the set of modulation and coding indicators, and transmitted from the terminal apparatus on the scheduled resources in accordance with a transmission power value of the data,
   wherein,
   when the transmission power value indicates a higher transmission power, a reference set of modulation and coding indicators is included in the scheduling information, and when the transmission power value indicates a lower transmission power, a first set of modulation and coding indicators is included in the scheduling information, the first set of modulation and coding indicators including at least one modulation and coding indicator indicative of a modulation order lower than a modulation order indicated by the same modulation and coding indicator in the reference set of modulation coding indicators.

3. The terminal apparatus according to claim 1, wherein the modulation and coding indicator indicates an amount of data used in the scheduled transmission.

4. The terminal apparatus according to claim 3, wherein the modulation and coding indicator consists of a plurality of bits and is defined to be capable of taking:
 a plurality of values that indicate different amounts of data used in the scheduled transmission; and
 a plurality of values that indicate different modulation orders.

5. The terminal apparatus according to claim 1, wherein the processor, in operation, compares the transmission power value with a threshold value.

6. The terminal apparatus according to claim 1, wherein the receiver, in operation, receives linking information, said linking information indicating the modulation and coding indicator to be selected.

7. The terminal apparatus according to claim 1, wherein the modulation and coding indicator indicates an amount of data used in the scheduled transmission in association with the modulation order, and the first set of modulation and coding indicators includes at least one modulation order associated with a larger amount of data used in the scheduled transmission than an amount of data used in the scheduled transmission associated with the same modulation order in the reference set of modulation and coding indicators.

8. A method for communicating data in a communication system, the method comprising:
 receiving, at a terminal from a scheduling node, scheduling information indicating resources on which the terminal is scheduled to transmit data to the scheduling node, the scheduling information including a set of modulation and coding indicators;
 selecting, at the terminal, a modulation and coding indicator out of the received set of modulation and coding indicators; and
 transmitting, from the terminal to the scheduling node, the data modulated and coded in accordance with the selected modulation and coding indicator on the scheduled resources in accordance with a transmission power value of the data,
wherein,
when the transmission power value indicates a higher transmission power, a reference set of modulation and coding indicators is included in the scheduling information, and
when the transmission power value indicates a lower transmission power, a first set of modulation and coding indicators is included in the scheduling information, the first set of modulation and coding indicators including at least one modulation and coding indicator indicative of a modulation order lower than a modulation order indicated by the same modulation and coding indicator in the reference set of modulation coding indicators.

9. The method according to claim 8, wherein the modulation and coding indicator indicates an amount of data used in the scheduled transmission.

10. The method according to claim 8, further comprising the terminal comparing the transmission power value with a threshold value.

11. The scheduling node apparatus according to claim 2, wherein the modulation and coding indicator indicates an amount of data used in the scheduled transmission.

12. The scheduling node apparatus according to claim 11, wherein the modulation and coding indicator consists of a plurality of bits and is defined to be capable of taking:
 a plurality of values that indicate different amounts of data used in the scheduled transmission; and
 a plurality of values that indicate different modulation orders.

13. The scheduling node apparatus according to claim 2, wherein the transmitter, in operation, transmits linking information, said linking information indicating the modulation and coding indicator to be selected by the terminal apparatus.

14. The scheduling node apparatus according to claim 2, wherein the modulation and coding indicator indicates an amount of data used in the scheduled transmission in association with the modulation order, and the first set of modulation and coding indicators includes at least one modulation order associated with a larger amount of data used in the scheduled transmission than an amount of data used in the scheduled transmission associated with the same modulation order in the reference set of modulation and coding indicators.

* * * * *